US009036032B2

(12) United States Patent
Ishii et al.

(10) Patent No.: US 9,036,032 B2
(45) Date of Patent: *May 19, 2015

(54) IMAGE PICKUP DEVICE CHANGING THE SIZE OF A BLUR KERNEL ACCORDING TO THE EXPOSURE TIME

(75) Inventors: Yasunori Ishii, Osaka (JP); Yusuke Monobe, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/697,686

(22) PCT Filed: May 11, 2011

(86) PCT No.: PCT/JP2011/002637
§ 371 (c)(1),
(2), (4) Date: Nov. 13, 2012

(87) PCT Pub. No.: WO2011/145297
PCT Pub. Date: Nov. 24, 2011

(65) Prior Publication Data
US 2013/0057714 A1    Mar. 7, 2013

(30) Foreign Application Priority Data

May 21, 2010    (JP) .................................. 2010-117676
May 25, 2010    (JP) .................................. 2010-119384

(51) Int. Cl.
*H04N 5/232*    (2006.01)
(52) U.S. Cl.
CPC ....... *H04N 5/23248* (2013.01); *H04N 5/23254* (2013.01); *H04N 5/23267* (2013.01)
(58) Field of Classification Search
CPC .......... H04N 5/23248; H04N 5/23267; H04N 5/23254

USPC ..................... 348/208.6, 222.1, 241; 382/261
See application file for complete search history.

(56) References Cited

U.S. PATENT DOCUMENTS

| 6,429,895 B1 | 8/2002 | Onuki |
| 2005/0057661 A1 | 3/2005 | Tanaka |

(Continued)

FOREIGN PATENT DOCUMENTS

| JP | 2005-064851 A | 3/2005 |
| JP | 2008-061217 A | 3/2008 |

(Continued)

OTHER PUBLICATIONS

International Search Report for corresponding International Application No. PCT/JP2011/002637 mailed Jun. 7, 2011.
International Preliminary Report on Patentability for corresponding International Application No. PCT/JP2011/002637 dated Feb. 14 2012.

(Continued)

*Primary Examiner* — Paul Berardesca
(74) *Attorney, Agent, or Firm* — Renner, Otto, Boisselle & Sklar, LLP

(57) ABSTRACT

This image capture device includes an image capturing section 100 which captures two images in mutually different exposure times, and an image processing section 220 which performs restoration processing on the images that have been captured by the image capturing section 100. The image processing section 220 includes a blur kernel determining section which determines a blur kernel that defines the camera-shake-induced motion blur of the image captured; and an image restoration section which generates the restored image. The blur kernel determining section changes the size of the blur kernel according to the exposure time in which the image is captured.

7 Claims, 16 Drawing Sheets

(56) References Cited

U.S. PATENT DOCUMENTS

| | | |
|---|---|---|
| 2006/0279639 A1 | 12/2006 | Silverstein et al. |
| 2007/0154197 A1 | 7/2007 | Saijo et al. |
| 2008/0002900 A1 | 1/2008 | Miki et al. .................... 382/254 |
| 2008/0027994 A1 | 1/2008 | Guan |
| 2008/0166115 A1 | 7/2008 | Sachs et al. ..................... 396/55 |
| 2008/0266413 A1 | 10/2008 | Cohen et al. |
| 2009/0086174 A1 | 4/2009 | Fukumoto et al. |
| 2010/0053346 A1 | 3/2010 | Mitsunaga |
| 2010/0053350 A1 | 3/2010 | Miyauchi et al. .......... 348/222.1 |
| 2010/0208944 A1 | 8/2010 | Fukunishi |

FOREIGN PATENT DOCUMENTS

| | | | | |
|---|---|---|---|---|
| JP | 2008-099025 | * | 4/2008 | ............. H04N 5/232 |
| JP | 2008-099025 A | | 4/2008 | |
| JP | 2009-111596 A | | 5/2009 | |
| WO | 2006/030488 A1 | | 3/2006 | |

OTHER PUBLICATIONS

Fergus et al., "Removing Camera Shake from a Single Photograph", SIGGRAPH 2006 (cited in [0007] of the specification).

Shan et al., "High-quality Motion Deblurring from a Single Image", SIGGRAPH, 2008 (cited in [0007] of the specification).

Co-pending U.S. Appl. No. 13/697,624, filed Nov. 13, 2012 (application provided).

Office Action dated Sep. 17, 2014 for Co-pending U.S. Appl. No. 13/697,624.

Extended European Search report for corresponding EP Application No. 11783235.3 dated Mar. 20, 2014.

Supplementary European Search Report for corresponding European Application No. 11783236.0 dated Mar. 20, 2014.

Chinese Search Report for corresponding Chinese Application No. 201180024954.0 dated Jan. 19, 2015 and English translation.

* cited by examiner

FIG.4
(a)
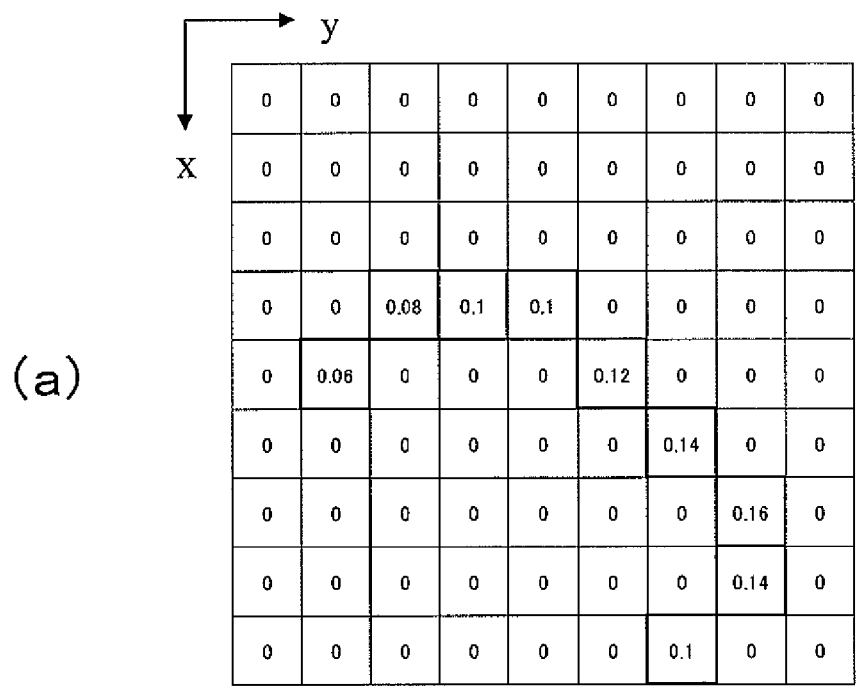
(b)
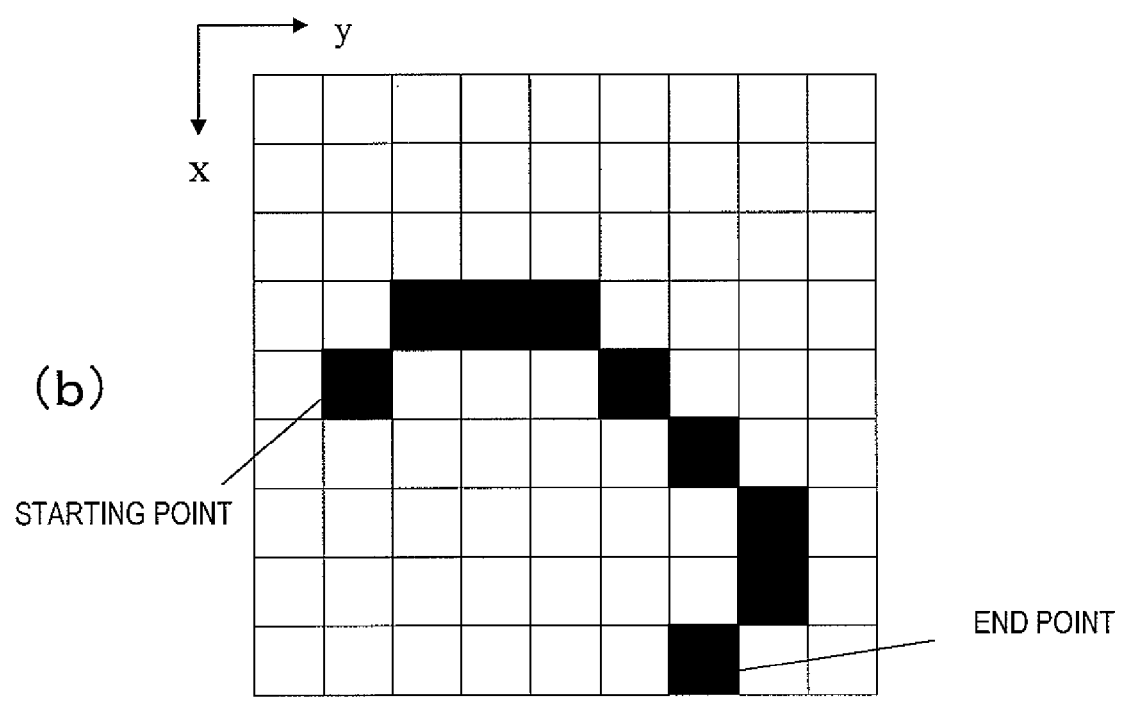
STARTING POINT
END POINT

FIG.5
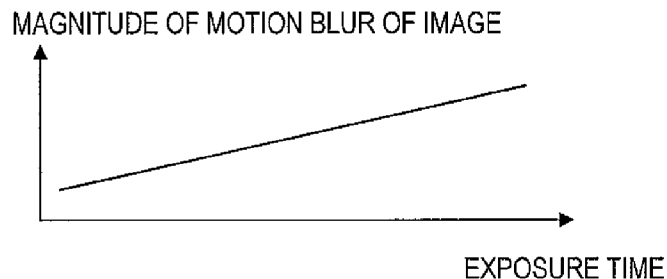
FIG.6
(a) MOTION BLUR OF IMAGE: SMALL
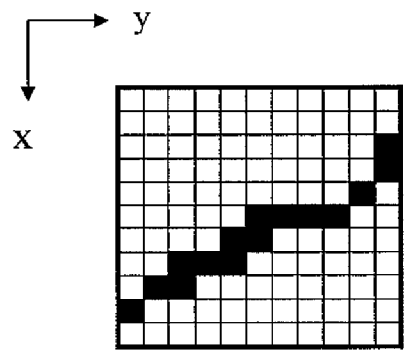
(b) MOTION BLUR OF IMAGE: LARGE
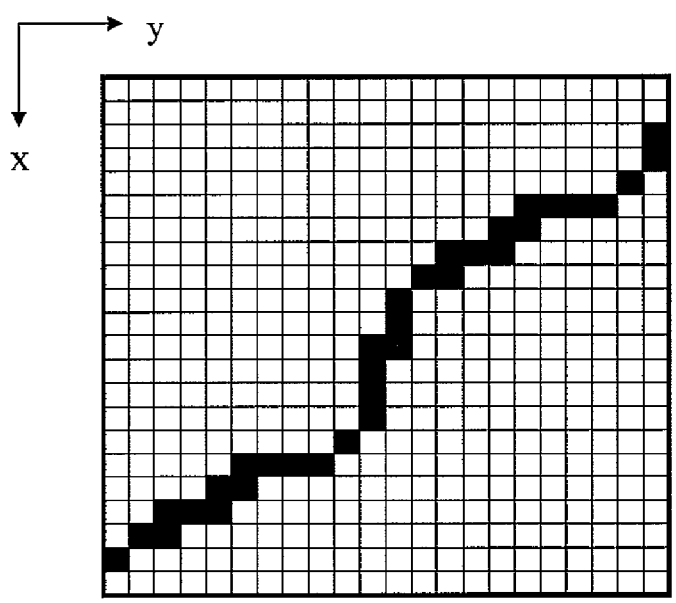

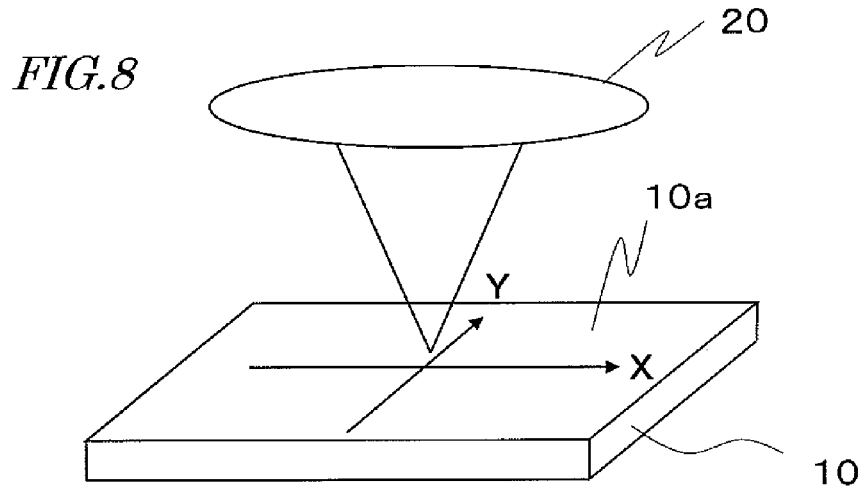
FIG.8
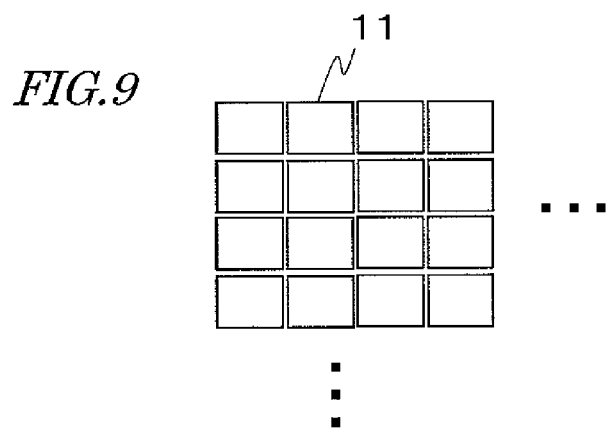
FIG.9
FIG.10
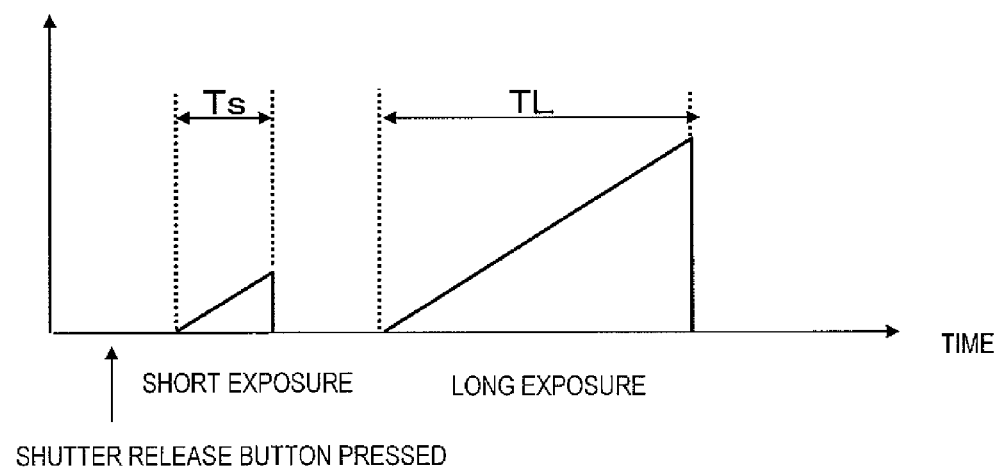

| EXPOSURE TIME | BLUR KERNEL'S MAGNIFICATION |
|---|---|
| T1-T2 | A1 |
| T2-T3 | A2 |
| ⋮ | ⋮ |

(b)

| EXPOSURE TIME | BLUR KERNEL'S SIZE |
|---|---|
| T1-T2 | N1 × N1 |
| T2-T3 | N2 × N2 |
| ⋮ | ⋮ |

| ZOOM POWER | EXPOSURE TIME | BLUR KERNEL'S MAGNIFICATION |
|---|---|---|
| z1-z2 | T1-T2 | C11 |
| . | T2-T3 | C12 |
| . | . | . |
| . | . | . |
| . | . | . |
| z2-z3 | T1-T2 | C21 |
| . | T2-T3 | C22 |
| . | . | . |
| . | . | . |

(b)

| ZOOM POWER | EXPOSURE TIME | BLUR KERNEL'S SIZE |
|---|---|---|
| z1-z2 | T1-T2 | N11 × N11 |
| . | T2-T3 | N12 × N12 |
| . | . | . |
| . | . | . |
| z2-z3 | T1-T2 | N21 × N21 |
| . | T2-T3 | N22 × N22 |
| . | . | . |
| . | . | . |

IMAGE PICKUP DEVICE CHANGING THE SIZE OF A BLUR KERNEL ACCORDING TO THE EXPOSURE TIME

TECHNICAL FIELD

The present invention relates to an image capture device, image processor, image processing method and image processing program for generating a restored image by reducing the motion blur that has been induced by a camera shake while capturing an image.

BACKGROUND ART

When an image is gotten (i.e., captured) with a digital camera, noise may be added to the image depending on a characteristic of its own CCD (charge-coupled device) or CMOS read circuit or a property of the transmission line. In addition, the image may also get blurred due to either out-of-focus shooting or a camera shake. In this manner, the quality of an image shot may deteriorate due to not only the noise resulting from the image's own characteristic but also the blur that has been caused by hand during the shooting operation. Among these multiple different kinds of "blurs", the blur of an image that has been induced by the movement of a camera during shooting (or exposure) will be sometimes referred to herein as a "motion blur".

Recently, as there is a growing demand for high-sensitivity shooting, it has become more and more necessary to restore such a blurry deteriorated image (which will be simply referred to herein as a "deteriorated image") to the original condition (which will be referred to herein as an "ideal image") as perfectly as possible. To capture a bright and noise- or blur-free image that should be obtained by high-sensitivity shooting, there are roughly two approaches: one of them is to increase the sensitivity and the other is to extend the exposure time.

If the sensitivity is increased, however, then the noise will be amplified, too. As a result, the signal will be drowned in the noise, and the resultant image will be mostly covered with the noise in many cases. On the other hand, if the exposure time is extended, the light produced on the spot can be accumulated a lot and the resultant image will have much less noise. In that case, the signal will not be drowned in the noise but the image will get shaky much more easily due to a camera shake, which is a problem.

Thus, in order to extend the exposure time, two different approaches have been taken so far. One of them is optical image stabilization such as a lens shift or a sensor shift. According to the other method, the direction and/or the magnitude of the motion blur is/are obtained based on the captured image or by the sensor and then subjected to signal processing, thereby restoring the image (which will be referred to herein as a "restoration method by signal processing").

The optical image stabilization has only a limited correction range. If the exposure time is extended, a camera shake will be produced more easily, and therefore, the lens or the sensor needs to be shifted in a broader range. However, the longer the distance the lens or sensor needs to go, the longer the time delay caused by their shift. In addition, a physical limit prevents the designer from increasing the size of the camera unlimitedly.

Meanwhile, the restoration methods by signal processing are disclosed in Patent Documents Nos. 1 and 2 and Non-Patent Documents Nos. 1 and 2, for example. Hereinafter, those restoration methods by signal processing will be described.

Suppose the intensity distribution of an image produced on the imaging area of an image sensor is represented by I(x, y). The coordinates (x, y) are two-dimensional coordinates indicating the location of a pixel (i.e., a photosensitive cell) on the imaging area. For example, if the image is made up of M×N pixels that are arranged in columns and rows and if x and y are integers that satisfy the inequalities $0 \leq x \leq M-1$ and $0 \leq y \leq N-1$, respectively, then the location of each of the pixels that form the image can be indicated by a set of coordinates (x, y). In this example, the origin (0, 0) of the coordinate system is supposed to be put at the upper left corner of the image, the x-axis is supposed to run vertically and the y-axis is supposed to run horizontally. However, the coordinate system may also be defined in any other way.

If the intensity distribution of a blur-free image (which is an ideal image or what the image should be) is represented by L(x, y), a point spread function (PSF) that defines the blur is represented by PSF(x, y) and the noise is represented by n(x, y), then the following Equation (1) is satisfied:

$$I(x,y) = PSF(x,y) * L(x,y) + n(x,y) \quad (1)$$

where the sign * indicates a two-dimensional convolution operation.

The point spread function PSF(x, y) of a camera shake depends on the trace of the camera that has been shaken (which will be referred to herein as a "camera shake trace") during shooting (or exposure). Since the camera shake trace changes every time an image is shot with the camera, PSF(x, y) also changes every shooting session with the camera.

If the camera shake trace during shooting has been detected by a gyrosensor, for example, and if PSF(x, y) is known, the deteriorated image I(x, y) can be restored to an image L(x, y) by performing a deconvolution operation using that PSF(x, y). On the other hand, unless PSF(x, y) is known, the deteriorated image I(x, y) needs to be restored to the image L(x, y) by estimating PSF(x, y) based on the deteriorated image I(x, y). The former method is called a "non-blind deconvolution", while the latter method is called a "blind deconvolution". Since PSF(x, y) and the image L(x, y) both need to be estimated based on the deteriorated image I(x, y) according to the blind deconvolution method, it is more difficult to reduce the blur than when the non-blind deconvolution method is adopted.

A PSF convolution operation that defines a camera-shake-induced motion blur is performed with a linear filter. A two-dimensional convolution operation linear filter is usually represented by a kernel consisting of a coefficient matrix with a size of N×N pixels, where N is an integer that is equal to or greater than three. The PSF that defines a blur can be represented by a blur kernel. Thus, to restore a blurry image to a less blurred (or non-blurred) image, the blur kernel that defines the blur needs to be estimated.

As a method for restoring an image by signal processing, Non-Patent Document No. 1 discloses that a multi-scale inference scheme is used to infer a blur kernel and a restored image based on a single blurry image. According to that multi-scale inference scheme, first of all, a blur kernel having a size of 3×3 pixels is inferred by using a deteriorated image with a low resolution. After that, by gradually increasing the resolution of the deteriorated image for use in inference, the resolution of the blur kernel is also raised. FIGS. 19(*a*) through 19(*h*) illustrate the method disclosed in Non-Patent Document No. 1. The upper part of FIG. 19(*a*) shows a blur kernel of 3×3 pixels, while the lower part shows a restored image with a corresponding resolution. The same statement applies to FIGS. 19(b) through 19(h), in which the resolution increases gradually in this order.

As there are a small number of pixels in the deteriorated image with a low resolution, the size of pixels with a camera-shake-induced motion blur is also small. As a result, in the deteriorated image with a low resolution, the size of the blur kernel becomes small and the complexity of computations to do to infer the blur kernel is also little. Moreover, if the blur kernel were inferred using a deteriorated image with a high resolution and a large number of pixels from the beginning, then the inference could converge to a local minimal representing a different blur kernel from the true one. According to the multi-scale inference scheme, however, the blur kernel can be inferred more accurately.

Meanwhile, Patent Document No. 1 discloses a method for obtaining a less blurry restored image based on two pictures that have been gotten consecutively. According to that method, a blur kernel is inferred from each of a first image and a second image that has been gotten through a shorter exposure process than the first image. A synthesized blur kernel obtained by synthesizing together the two blur kernels inferred and a synthetic image obtained by synthesizing together the first and second images form a single restored image. According to this method, the restoration processing is carried out only if the first image is significantly blurred locally but is not carried out if the first image is blurred only slightly.

CITATION LIST

Patent Literature

Patent Document No. 1: Japanese Laid-Open Patent Publication No. 2008-99025
Patent Document No. 2: Japanese Laid-Open Patent Publication No. 2009-111596

Non-Patent Literature

Non-Patent Document No. 1: Rob Fergus et al., "Removing Camera Shake from a Single Image", Barun Singh Aaron Hertzmann, SIGGRAPH 2006
Non-Patent Document No. 2: "High-quality Motion Deblurring from a Single Image", Qi Shan, Jiaya Jia, and Aseem Agarwala, SIGGRAPH 2008

SUMMARY OF INVENTION

Technical Problem

In the related art, the final size of the blur kernel is set to be a fixed value in advance. That is why to perform restoration processing properly on a deteriorated image with a significant motion blur, the size of the blur kernel needs to be set to be a large value. A deteriorated image with a significant motion blur, which is even greater than the preset blur kernel size, cannot be restored properly.

Particularly, in shooting an image in a dark environment, the exposure time needs to be extended in order to secure a sufficient quantity of light. Generally speaking, however, the longer the exposure time, the more significantly the image will get shaky due to a camera shake. For that reason, even if the exposure time is extended to shoot a dark scene, the size of the blur kernel should also be set to be a large value in advance.

If the size of the blur kernel is increased, however, restoration processing using a blur kernel of such a large size will be performed even on a slightly shaky image, and therefore, excessive computation should be carried out to get the restoration processing done in such a case. For example, if the size of the blur kernel is set to be 100×100 pixels and if an image, of which the motion blur can be defined with only 10×10 of those pixels, is going to be restored, unnecessary computation will have to be carried out on 9900 pixels (=100×100−10× 10).

The present inventors made our invention in order to overcome those problems with the related art. And an object of the present invention is to provide an image restoration technique which can avoid doing such unnecessary computations to get the restoration processing done if the deteriorated image is only slightly shaky and which can obtain a restored image as intended even if the deteriorated image is significantly shaky.

Solution to Problem

An image capture device according to the present invention is configured to generate a restored image by reducing a motion blur that has been induced by a camera shake during shooting. The device includes: an image capturing section which captures a first image and a second image, which is obtained in a shorter exposure time than the first image, in a single shooting session; and an image processing section which performs restoration processing on the first and second images that have been captured by the image capturing section. The image processing section includes: a blur kernel determining section which determines a blur kernel that defines the camera-shake-induced motion blur of the first image that has been captured by the image capturing section; and an image restoration section which generates the restored image by using the blur kernel that has been determined. The blur kernel determining section changes the size of the blur kernel according to the exposure time in which the first image is captured.

In one embodiment, the blur kernel determining section increases the size of the blur kernel as the exposure time becomes longer.

In one embodiment, the image capture device further includes a conversion table which defines a correspondence between the exposure time and the size of the blur kernel, and the blur kernel determining section sets the size of the blur kernel by reference to the conversion table.

In one embodiment, the conversion table defines a correspondence between the exposure time and the magnification of the blur kernel with respect to its reference size.

In one embodiment, if the blur kernel is called a first blur kernel, the blur kernel determining section determines a second blur kernel which defines the camera-shake-induced motion blur of the second image, and the image restoration section generates the restored image using the first and second blur kernels.

In one embodiment, the image processing section includes an image synthesizing section which generates a third image by synthesizing together the first and second images, and the restoration section generates the restored image based on the third image by using the first and second blur kernels.

In one embodiment, the image processing section includes an image synthesizing section which synthesizes together multiple images. The image restoration section generates a first restoration-in-progress image based on the first image by reference to the first blur kernel and also generates a second restoration-in-progress image based on the second image by reference to the second blur kernel. The image synthesizing section synthesizes together the first and second restoration-in-progress images, thereby generating the restored image.

In one embodiment, the image capture device further includes a blur detecting section which determines the degree of blur of the first image by comparing the first and second images that have been captured by the image capturing section. If the degree of blur of the first image that has been determined by the blur detecting section is greater than a predetermined reference value, the image processing section performs the restoration processing. But if the degree of blur of the first image is less than the reference value, the image processing section does not perform the restoration processing.

In one embodiment, the blur kernel determining section further changes the size of the blur kernel according to a zoom power to capture the first image with.

An image processor according to the present invention is configured to perform restoration processing using a first image and a second image that have been captured by an image capture device in a single shooting session. The second image is captured in a shorter exposure time than the first image. The processor includes: an image getting section which gets the first and second images and an exposure time in which the first image is captured; a blur kernel determining section which determines a blur kernel that defines the camera-shake-induced motion blur of the first image that has been captured by an image capturing section; and an image restoration section which generates the restored image by using the blur kernel that has been determined. The blur kernel determining section changes the size of the blur kernel according to the exposure time in which the first image is captured.

An image processing program according to the present invention is a program for performing restoration processing using a first image and a second image that have been captured by an image capture device in a single shooting session. The second image is captured in a shorter exposure time than the first image. The program is defined so as to make a computer perform the steps of: getting the first and second images and information about the exposure time in which the first image is captured; setting the size of the blur kernel, which defines the camera-shake-induced motion blur of the first image, based on the exposure time in which the first image is captured; determining the blur kernel; and generating a restored image using the blur kernel determined.

An image processing method according to the present invention is a method for performing restoration processing using a first image and a second image that have been captured by an image capture device in a single shooting session. The second image is captured in a shorter exposure time than the first image. The method includes the steps of: getting the first and second images and information about the exposure time in which the first image is captured; setting the size of the blur kernel, which defines the camera-shake-induced motion blur of the first image, based on the exposure time in which the first image is captured; determining the blur kernel; and generating a restored image using the blur kernel determined.

Advantageous Effects of Invention

According to the present invention, it is possible to avoid doing unnecessary computations to get the restoration processing done if the deteriorated image is only slightly shaky and to obtain a restored image as intended even if the deteriorated image is significantly shaky.

BRIEF DESCRIPTION OF DRAWINGS

FIG. 4 (a) shows an example of a blur kernel's coefficient matrix consisting of 9×9 pixels and (b) indicates those elements with non-zero values by the solid squares, and the other elements with a value of zero by the open squares, respectively, among the coefficients shown in FIG. 4(a).

FIG. 5 A graph showing, as an example, how the size of a blur kernel may change with the exposure time.

FIG. 6 (a) shows that when the camera shake is expected to be insignificant, the size of the blur kernel is set to be a small value and (b) shows that when the camera shake is expected to be significant, the size of the blur kernel is set to be a large value.

FIG. 8 Schematically illustrates a general arrangement for the image sensor 10 and shooting lens 20 in the image capturing section 100.

FIG. 9 A top view schematically illustrating the imaging area 10a of the image sensor 10.

FIG. 10 A graph showing how the quantity of electric charge stored in a single photosensitive cell changes through an exposure process.

FIG. 12 (a) shows an example of a conversion table for use in an embodiment and (b) shows another example of a conversion table for use in another embodiment.

FIG. 18 (a) shows an example of a zoom power-exposure time combination related conversion table and (b) shows another example of such a conversion table.

DESCRIPTION OF EMBODIMENTS

Before preferred embodiments of the present invention are described, the fundamental principle of the present invention will be described first. In this description, the "size" of an image or a blur kernel is supposed to be synonymous with its "number of pixels" or "pixel size".

Figure 1A:
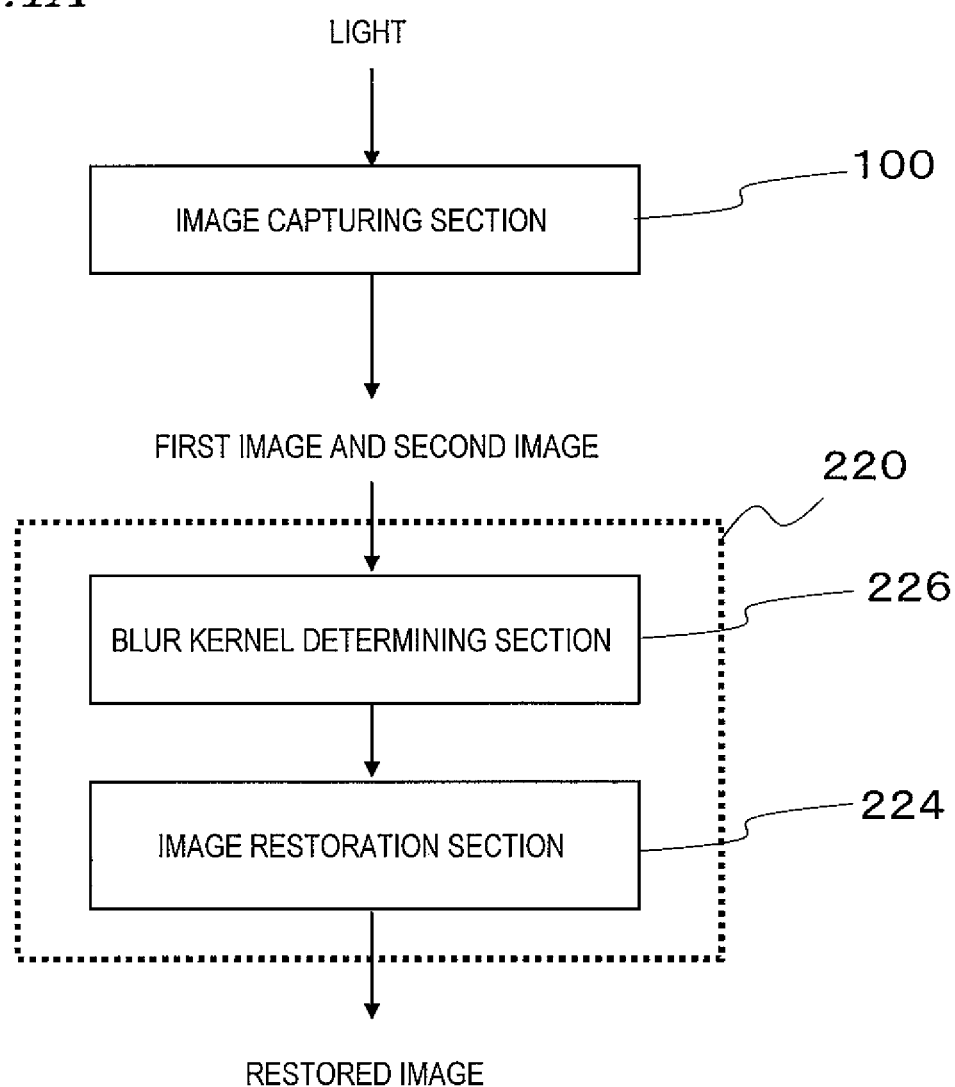
FIG. 1A Illustrates an exemplary general configuration for an image capture device according to the present invention.

FIG. 1A illustrates a general configuration for an image capture device according to the present invention. The image capture device includes an image capturing section 100 which captures an image and an image processing section 220 which performs restoration processing based on the image that has been captured by the image capturing section 100. The image capturing section 100 captures a first image and a second image, which is obtained in a shorter exposure time than the first image, in a single shooting session. The image processing section 220 includes a blur kernel determining section 226 which determines a blur kernel that defines the camera-shake-induced motion blur of the first image that has been captured by the image capturing section 100 and an image restoration section 224 which generates the restored image. The blur kernel determining section 226 changes the size of the blur kernel according to the exposure time in which the first image is captured.

Figure 1B:
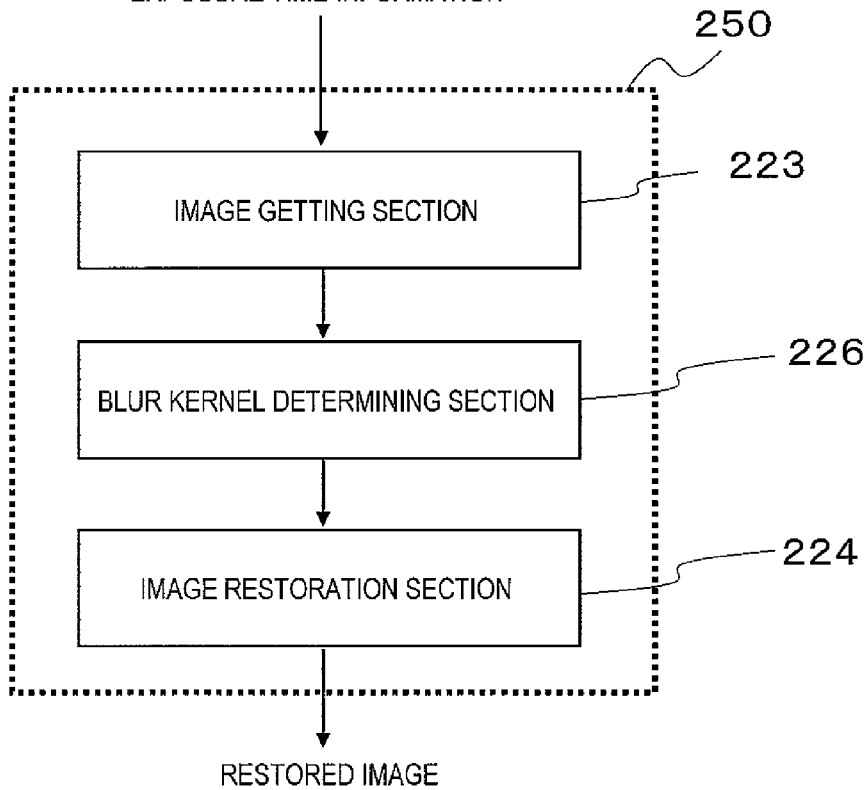
FIG. 1B Illustrates an exemplary general configuration for an image processor according to the present invention.

FIG. 1B illustrates an exemplary general configuration for an image processor according to the present invention. The image processor 250 performs restoration processing based on the two images that have been captured by the image capture device, which captures a first image and a second image, which is obtained in a shorter exposure time than the first image, in a single shooting session. The image processor 250 includes an image getting section which gets the first and second images and information about an exposure time in which the first image is captured, a blur kernel determining section which determines a blur kernel that defines the motion blur of the first image, and an image restoration section which generates the restored image. The blur kernel determining section changes the size of the blur kernel according to the exposure time in which the first image is captured.

Figure 1C:
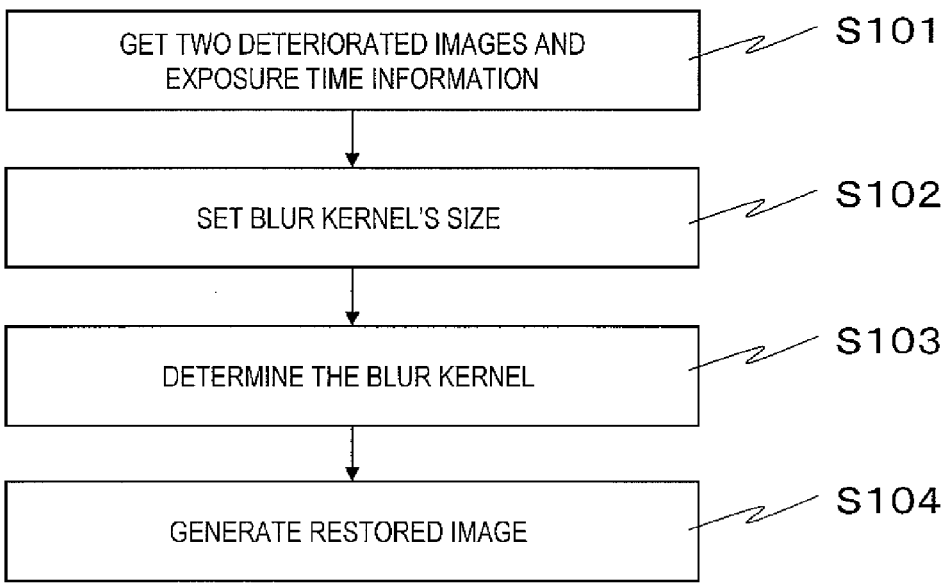
FIG. 1C A flowchart showing an exemplary flow of the image restoration processing to be carried out by either the image processing section or the image processor.

FIG. 1C is a flowchart showing an exemplary flow of the image restoration processing to be carried out by either the image processing section 220 or the image processor 250. First, in Step S101, two deteriorated images that have been captured by an image capture device and exposure time information are gotten. Next, in Step S102, the size of a blur kernel that defines the degree of motion blur of the deteriorated images is set. Subsequently, in Step S103, the blur kernel is determined. And then in Step S104, a restored image is generated using the blur kernel that has been determined. By performing these processing steps, a restored image can be obtained with the motion blur removed from the two deteriorated images. According to the present invention, by setting the size of the blur kernel appropriately by reference to the exposure time to get the image, the restoration can get done highly accurately without doing unnecessary computations. These processing steps will be described in further detail later.

Figure 2:
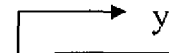
FIG. 2 (a) illustrates an example of a blur kernel with a size of 3×3 pixels and (b) shows an example of a pixel value arrangement of a non-blurry image.

Next, it will be described with reference to FIG. 2 specifically what the blur kernel is according to the present invention.

FIG. 2(a) illustrates an example of a blur kernel with a size of 3×3 pixels. This blur kernel defines an example of a motion blur that has been induced by a horizontal camera shake of three pixels during an exposure process. FIG. 2(b) shows an example of a pixel value arrangement of a non-blurry image, which is supposed to have a size of 5×5 pixels. The twenty-five numerical values shown in FIG. 2(b) are exemplary intensity values of pixels that form the image.

If a motion blur, which is represented by the blur kernel shown in FIG. 2(a), has been induced by a camera shake, the deteriorated image can be obtained by performing a two-dimensional convolution operation on the image shown in FIG. 2(b) by using the blur kernel shown in FIG. 2(a).

Supposing the blur kernel, the original image and the noise are identified by K, L and N, respectively, the image I that has been obtained by shooting (i.e., the deteriorated image) is represented by the following Equation (2):

$$I = K * L + N \tag{2}$$

Figure 3A:
FIG. 3A Shows the result of the convolution operation that has been performed on the pixel located at (x, y)=(2, 2) in the image shown in FIG. 2(b).

FIG. 3A shows the result of the convolution operation that has been performed on the pixel located at (x, y)=(2, 2) in the image shown in FIG. 2(b). This operation is carried out on the nine pixels (=3×3 pixels) that are enclosed within the dashed rectangle that is located at the upper left corner of the image shown in FIG. 3A. Of the nine coefficients of the blur kernel, three elements have values of 0.2, 0.4 and 0.4, respectively, but the other six elements have a value of zero. If the convolution operation is performed using this blur kernel, these coefficients of 0.2, 0.4 and 0.4 are multiplied by the values of three pixels located at (2, 1), (2, 2) and (2, 3), respectively, in the image and then those products are added together to calculate a sum. As a result, a value of 19.6 (=18×0.2+19×0.4+21×0.4) is obtained and is stored at the location (2, 2) as a pixel value after the operation.

Figure 3B:
FIG. 3B Shows the result of the convolution operation that has been performed on the pixel located at (x, y)=(2, 3) in the image shown in FIG. 2(b).

On the other hand, FIG. 3B shows the result of the convolution operation that has been performed on the pixel located at (x, y)=(2, 3) in the image shown in FIG. 2(b). This operation is carried out on the nine pixels (=3×3 pixels) that are enclosed within the dashed rectangle that is located at the upper left corner of the image shown in FIG. 3B. If the convolution operation is performed using this blur kernel, the coefficients of 0.2, 0.4 and 0.4 are multiplied by the values of three pixels located at (2, 2), (2, 3) and (2, 4), respectively, in the image and then those products are added together to calculate a sum. As a result, a value of 19.4 (=19×0.2+21×0.4+18×0.4) is obtained and is stored at the location (2, 3) as a pixel value after the operation.

By making such calculations with the center position of the blur kernel shifted with respect to the pixel values of an image with a given resolution (i.e., a given number of pixels), an image that has gone through the convolution operation, that is, an image with a camera-shake-induced motion blur (i.e., a deteriorated image), can be obtained.

In order to restore the deteriorated image to a non-blurry image, the coefficient matrix of the blur kernel that would cause the deterioration needs to be estimated. And if the blur kernel can be estimated, an image that has not deteriorated yet can be recovered by performing a deconvolution operation.

FIG. 4(a) shows an example of a blur kernel's coefficient matrix consisting of 9×9 pixels. This coefficient matrix is standardized so that the sum of non-zero coefficients becomes equal to one. In FIG. 4(b), of the coefficients shown in FIG. 4(a), those elements with non-zero values are indicated by the solid squares, while the other elements with a value of zero are indicated by the open squares. The set of those solid elements shown in FIG. 4(a) corresponds to the trace of the camera shake. The set of solid elements shown in FIG. 4(b) may have a different pattern according to the camera shake trace left during the exposure process.

Since the camera shake is caused by the movement of a camera during an exposure process, its trace is represented by either a line or a curve that connects the starting point and the end point together. As shown in FIG. 4(b), in the camera shake trace represented by the blur kernel with a finite size, even a "curve" which forms only a part of that trace can also be obtained by connecting two pixels together with a line.

According to the present invention, the size of the blur kernel is not set in advance before shooting but is set adaptively according to the exposure time during shooting.

FIG. 5 is a graph showing, as an example, how the magnitude of a motion blur of an image may change with the exposure time. In general, the longer the exposure time, the greater the magnitude of a motion blur of an image. This is because the longer the exposure time, the more significantly camera shakes accumulated and the greater the magnitude of the motion blur of the image.

Hereinafter, exemplary sizes of the blur kernel that may be set according to the present invention will be described. FIG. 6(a) shows the size of a blur kernel in an image with a relatively small magnitude of motion blur, which corresponds to a situation where the exposure time is short. In that case, the size of the blur kernel is set to be relatively small. On the other hand, FIG. 6(b) shows the size of a blur kernel in an image with a relatively large magnitude of motion blur, which corresponds to a situation where the exposure time is long. In that case, the size of the blur kernel is set to be relatively large.

As can be seen, according to the present invention, the size of a blur kernel is set adaptively to the expected magnitude of motion blur by reference to the exposure time. As a result, when restoration processing is carried out on an image with a slight motion blur, it is possible to avoid doing computations more than necessarily. In addition, since the size of the blur kernel is not fixed in advance unlike the related art, even a significantly blurred image can also be restored properly.

Hereinafter, a preferred embodiment of the present invention will be described with reference to FIGS. 7 through 13. In the following description, any pair of components shown in multiple drawings and having substantially the same function will be identified by the same reference numeral.

EMBODIMENTS

Figure 7:
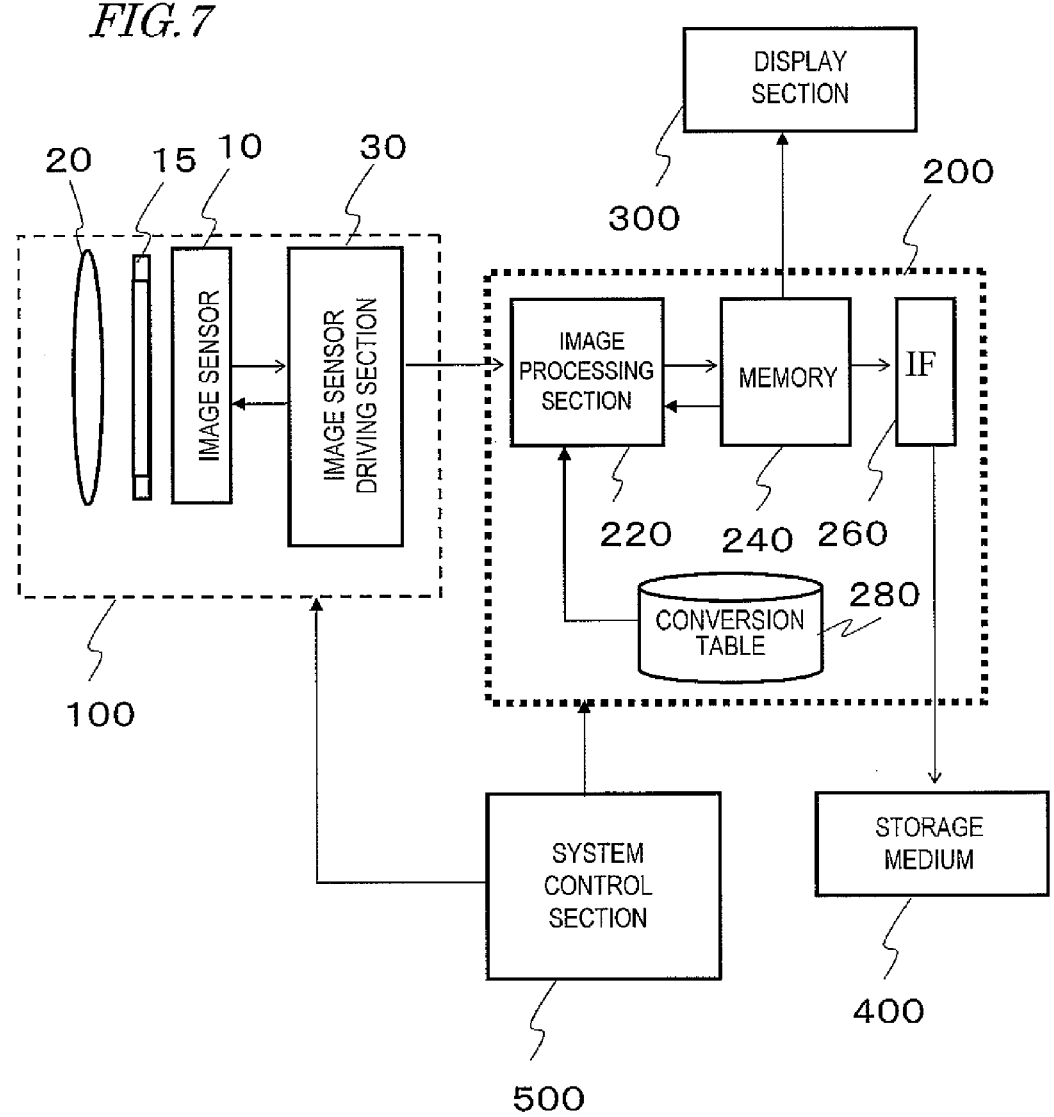
FIG. 7 A block diagram illustrating a general configuration for an image capture device as an embodiment of the present invention.

FIG. 7 is a block diagram illustrating a general configuration for an image capture device as this first embodiment. The image capture device of this embodiment is a digital electronic camera with an image stabilization function and includes an image capturing section 100, a signal processing section 200 which performs various kinds of signal processing, a captured image display section 300 which displays an image that has been captured through shooting, a storage medium 400 in which image data is stored, and a system control section 500 which controls these circuit sections.

The image capturing section 100 includes an imager (image sensor) 10 with a plurality of photosensitive cells (photodiodes) that are arranged on an imaging area, a shutter 15 with a diaphragm function, and a shooting lens 20 which produces an image on the imaging area of the image sensor 10. Typically, the image sensor 10 is a CCD sensor or a CMOS sensor. In this embodiment, the shooting lens 20 has a known configuration and is actually a lens unit made up of multiple lenses. The shutter 15 and the shooting lens 20 are driven by a mechanism (not shown) and perform various operations to get done for the purposes of optical zooming, autoexposure (AE), and autofocus (AF).

The image capturing section 100 further includes an image sensor driving section 30 to drive the image sensor 10. The image sensor driving section 30 may be implemented as an LSI such as a CCD driver, and drives the image sensor 10, thereby retrieving an analog signal from the image sensor 10 and converting it into a digital signal.

The signal processing section 200 includes an image processing section (image processor) 220, a memory 240, an interface (IF) section 260, and a conversion table 280. The conversion table 280 is a table which defines a relation between the exposure time during shooting and the size of the blur kernel. By reference to the information in the conversion table 280, the image processing section 220 changes the size of the blur kernel. Optionally, the conversion table 280 may be stored in either the memory 240 or any other storage medium. In the following description, the information recorded on the conversion table will be referred to herein as "conversion table information". The signal processing section 200 is connected to the display section 300 such as an LCD panel and to the storage medium 400 such as a memory card. The storage medium is removable from this image capture device.

The image processing section 220 carries out not only various kinds of signal processing to get color tone correction, resolution change, autoexposure, autofocusing, data compression and other operations done but also the deteriorated image restoration processing of the present invention. The image processing section 220 is suitably implemented as a combination of a known digital signal processor (DSP) or any other piece of hardware and a software program that is designed to perform image processing including the image restoration processing of the present invention. The memory 240 may be a DRAM, for example. The memory 240 not only stores the image data provided by the image capturing section 100 but also temporarily retains the image data that has been subjected to the various kinds of image processing by the image processing section 220 or compressed image data. Those image data are either converted into an analog signal and then displayed on the display section 300 or written as a digital signal on the storage medium 400 by way of the interface section 260.

All of these components are controlled by the system control section 500 including a central processing unit (CPU) and a flash memory, none of which are shown in FIG. 7. Actually, the image capture device of this embodiment further includes a viewfinder, a power supply (or battery), a flashlight and other known members. However, description thereof will be omitted herein because none of those members are essential ones that would make it difficult to understand how the present invention works unless they were described fully.

Next, an arrangement for the image capturing section 100 will be described with reference to FIGS. 8 and 9.

FIG. 8 schematically illustrates a general arrangement for the image sensor 10 and lens 20 in the image capturing section 100. As shown in FIG. 8, the image sensor has an imaging area 10a, on which a number of photosensitive cells are arranged.

FIG. 9 is a top view schematically illustrating the imaging area 10a. In this example, photosensitive cells 11 are arranged in column and rows to form a matrix pattern. However, the photosensitive cells 11 do not have to be arranged as shown in FIG. 9 and the planar shape of the respective photosensitive cells does not have to be a square shape, either. To generate a color image signal, typically, color filters representing primary colors or their complementary colors are arranged over the respective photosensitive cells 11. Alternatively, it is possible to adopt an arrangement including three image sensors which splits the incoming light into the three light rays of R, G and B and which receives those light rays in the respective colors at those three image sensors.

With such a configuration adopted, the image capturing section 100 can get an image through capturing. In this embodiment, the image capturing section 100 is configured to get two images in two different exposure times per shooting session when making an image stabilization operation. FIG. 10 is a graph showing an example of an image getting method according to this embodiment. In the graph shown in FIG. 10, the abscissa represents the time, and the ordinate represents the quantity of electric charge stored in a single photosensitive cell. It should be noted that only the quantities of electric charges stored in those two exposure processes are shown in FIG. 10, and the quantity of electric charge stored corresponding to an image to be displayed as a preview and other quantities are not shown. When the user presses down the shutter release button, an exposure process is carried out for a relatively short time $T_S$ to get a first image (which will be referred to herein as a "short exposure time image"). Subsequently, an exposure process is carried out for the second time for a longer time $T_L$ than $T_S$, thereby getting a second image (which will be referred to herein as a "long exposure time image"). Optionally, the short exposure time image and the long exposure time image may be obtained in reverse order. The long exposure time image has been gotten in a longer exposure time than the short exposure time image, and therefore, has a higher intensity level and a more significant camera-shake-induced motion blur. Meanwhile, the short exposure time image has a lower intensity level and a less significant camera-shake-induced motion blur. These two images, along with information about the exposure times (which will be referred to herein as "exposure time information"), are input to the signal processing section 200 and used to perform the image restoration processing.

Next, a configuration for the image processing section 220 will be described with reference to FIG. 11.

Figure 11:
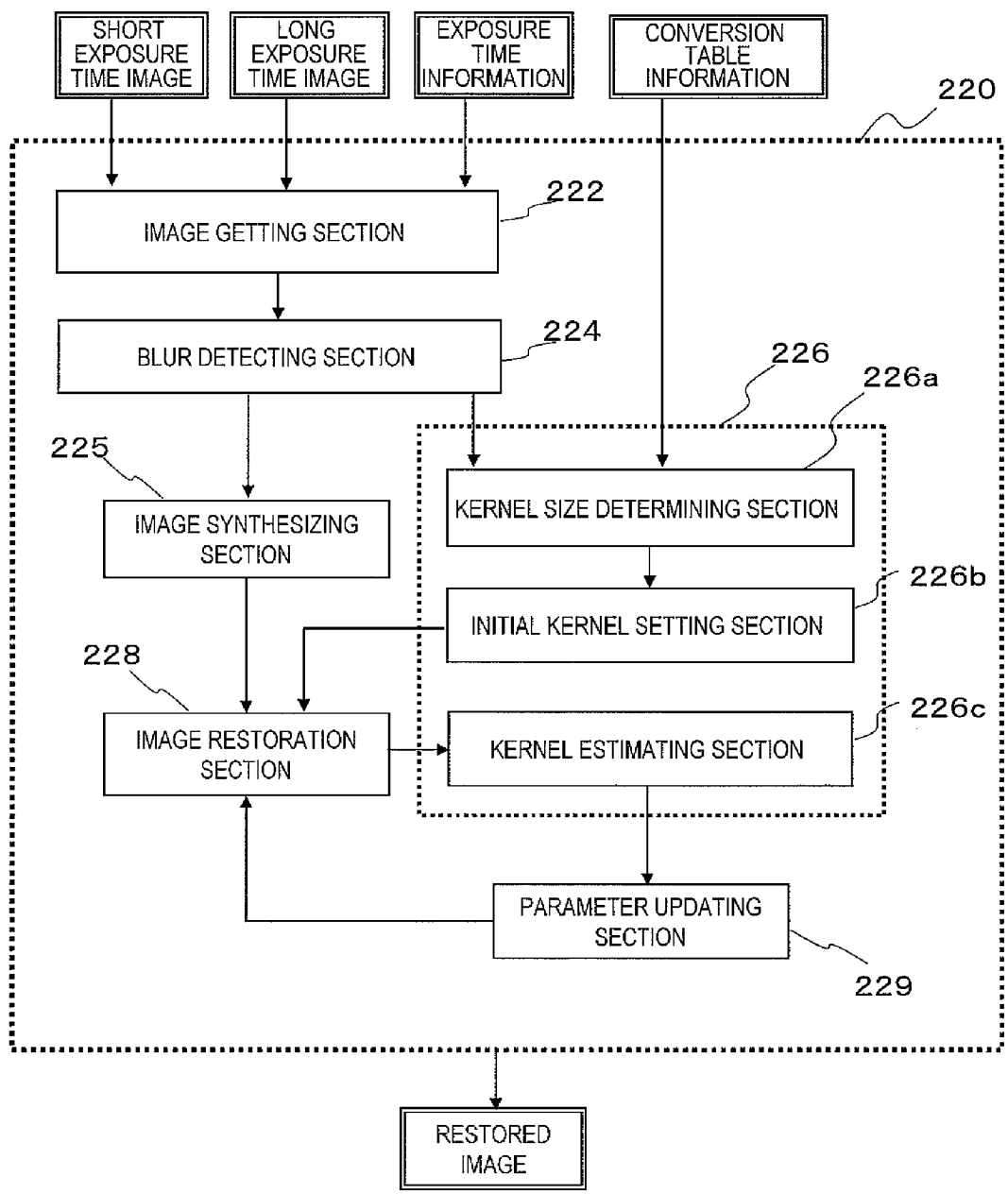
FIG. 11 A block diagram illustrating an exemplary configuration for the image processing section 220 shown in FIG. 6.

FIG. 11 is a block diagram illustrating a general configuration for the image processing section 220, which gets a long exposure time image, a short exposure time image, exposure time information and conversion table information and which generates a restored image, of which the camera-shake-induced motion blur has been reduced compared to the long exposure time image, and outputs it. The image processing section 220 includes an image getting section 222, a blur detecting section 224, an image synthesizing section 225, a blur kernel determining section 226, an image restoration section 228, and a parameter updating section 229. The blur kernel determining section 226 includes a kernel size determining section 226a, an initial kernel setting section 226b, and a kernel estimating section 226c.

The image getting section 222 gets the long exposure time image, the short exposure time image, and exposure time information from the image capturing section 100.

The blur detecting section 224 compares to each other the long and short exposure time images that have been gotten by the image getting section 222 and detects the degree of motion blur that the long exposure time image has. For example, by calculating the motion vector between two corresponding points on the two images by either the known representative point matching or block matching method, an estimated value indicating the degree of motion blur can be obtained. Alternatively, the degree of motion blur can also be estimated either based on the intensity ratio of radio frequency components of the two images or by the template matching. These estimation methods are disclosed in Japanese Laid-Open Patent Publication No. 2009-111596, for example. According to this embodiment, only if the estimated value indicating the degree of motion blur that has been obtained by the blur detecting section 224 is larger than a preset threshold value, the image restoration processing to be described later is carried out. It should be noted that the threshold value could be set to be an arbitrary value.

The image synthesizing section 225 synthesizes the long and short exposure time images together, thereby generating a single synthetic deteriorated image. The image synthesizing section 225 may generate the synthetic deteriorated image by adding together the respective intensity values of corresponding pixels of the long and short exposure time images, for example. In this case, instead of simply adding together the values of those corresponding pixels, those values may be added together after a weight has been added to the intensity levels of the long and short exposure time images so as to substantially equalize them with each other.

The kernel size determining section 226a determines the size of the blur kernel by reference to the exposure time information that has been gotten from the image capturing section 100 and the conversion table information recorded in the conversion table 280. Specifically, the kernel size determining section 226a obtains a "blur kernel's magnification" corresponding to the exposure time from the conversion table, multiplies a reference size by the blur kernel's magnification thus obtained, and defines the product to be the size of the blur kernel. In this description, the "exposure time" means the total exposure time $T_L+T_S$ when the long and short exposure time images are gotten and the "reference size" may be either set in advance as a fixed value for the image capture device or manually set by the user. In the latter case, the reference size may be set more appropriately with a difference in the magnitude of motion blur caused by individual users taken into account. Alternatively, a different blur kernel's size may be determined based on various shooting parameters to use to get the image every time a shooting session is carried out. The conversion table will be described in detail later.

The initial kernel setting section 226b sets an initial blur kernel which needs to be used to perform this restoration processing. The initial blur kernel may be either set manually or defined in advance as a fixed coefficient matrix. Still alternatively, every time a shooting session is carried out, a different initial blur kernel may also be set based on various kinds of shooting parameters to get an image. In order to get the image processing done as quickly as possible, it is recommended that the initial blur kernel be as close to the actual blur kernel as possible. However, the restoration processing can also be carried out even if the initial blur kernel is not close to the actual one. The size of the initial blur kernel may be set to be a different value according to the restoration algorithm to be described later. For example, if the algorithm disclosed in Non-Patent Document No. 1 is used, the size of the initial blur kernel may be set to be a relatively small value such as 3×3 pixels. On the other hand, if an algorithm that does not involve changing the size of the blur kernel is used in the restoration process, the size of the initial blur kernel may be the size determined by the kernel size determining section 226a.

The image restoration section 228 generates a restored image based on the synthetic deteriorated image that has been generated by the image synthesizing section 225 using the initial blur kernel. The kernel estimating section 226c estimates the blur kernel based on the synthetic deteriorated image and the restored image that has been generated by the image restoration section 224. The parameter updating section 229 updates the initial blur kernel into the one that has been estimated by the kernel estimating section 226c. The initial blur kernel updated is given to the image restoration section 228. And the same series of processing steps are carried out all over again by the image restoration section 228, the kernel estimating section 226c and the parameter updating section 229.

The configuration shown in FIG. 11 shows an exemplary set of functional blocks of the image processing section 220. And the image processing section 220 may be divided into any other set of functional blocks as well. The image processing section 220 may also be implemented by installing an image processing software program into a known piece of hardware as well.

Next, the conversion table of this embodiment will be described. FIG. 12(a) shows an example of a Conversion table for use in this embodiment. In this example, the conversion table defines a correspondence between the exposure time range and the blur kernel's magnifications. By reference to such a conversion table, the kernel size determining section 226a learns that if the exposure time ($T_L+T_S$) falls within the range of T1 through T2, the blur kernel's magnification should be set to be A1. FIG. 12(b) shows another exemplary conversion table. As in the example shown in FIG. 12(b), the size of the blur kernel may be defined so as to be directly determined by the exposure time. For example, if the exposure time ($T_L+T_S$) falls within the range of T2 through T3, the blur kernel's size is set to be N2×N2 (where N2 is an integer that is equal to or greater than three). In that case, there is no need to set the blur kernel reference size described above. The conversion table does not always have to be such ones but may also be any other kind of table as long as the table shows a correspondence between the exposure time and the size of the blur kernel.

The conversion table is drawn up beforehand as a piece of advance information. Hereinafter, it will be described as an example how such a conversion table may be drawn up.

First of all, with the exposure time set to be a particular value, multiple persons are made to shoot the same landmark object (such as a chart or a point light source, of which the traveling distance can be measured within a given image) a number of times and measure its traveling distance each time. Next, measurements are carried out in the same way with the exposure time changed into other values and the average of the traveling distances is calculated on an exposure time basis. And information indicating a relation between the average traveling distance thus obtained and the exposure time is written on the conversion table.

Optionally, the information stored on the conversion table may be rewritten as needed. For example, the image capture device may have the function of learning the trend of the motion blurs of images that have been shot by a user so far and rewriting the conversion table according to his or her trend.

Hereinafter, it will be described with reference to FIG. 13 generally in what procedure a shooting session may be carried out with the image capture device of this embodiment.

First of all, the user points the image capture device toward the subject and presses the shutter releases button halfway, when the focus is set on the subject through an autofocus operation. Next, when he or she presses the shutter release button down fully, an "exposure" process starts (in Step S1). At this point in time, a subject image is produced on the imaging area of the image sensor 10. If the image capture device is moved irregularly by the user during the exposure process, then the image moves over the imaging area of the image sensor 10. As a result, the image gets blurred due to the camera shake. When a relatively short amount of time $T_S$ passes since the exposure process started, the exposure process once stops, when the image sensor 10 retrieves the signal charge and a short exposure time image is captured (in Step S2). Subsequently, the second exposure process starts and lasts until a relatively long amount of time $T_L$ passes. When the time $T_L$ passes, the exposure process ends, and the image sensor 10 retrieves the signal charge again to capture a long exposure time image (in Step S3). Optionally, these processing steps S2 and S3 may be performed in reverse order as described above.

When the short and long exposure time images are captured, the image capturing section 100 inputs those two images captured and the exposure time information to the image processing section 220 in the signal processing section 200. Based on the information entered, the image processing section 220 performs image restoration processing, thereby generating a restored image, of which the camera-shake-induced motion blur has been reduced compared to the long exposure time image (in Step S4). The restored image thus generated is sent to either the display section 300 or the storage medium 400 and either displayed or stored there (in Step S5).

Hereinafter, the image restoration processing step S4 to be performed by the image processing section 220 will be described with reference to FIG. 14.

First of all, the image getting section 222 gets the short and long exposure time images in Step S41. Next, in Step S42, the blur detecting section 224 calculates estimated motion blur values indicating the degrees of motion blur of those two images gotten. The estimated motion blur values are obtained by any of the known methods as described above. Subsequently, in Step S43, the magnitude of the motion blur is determined based on the estimated motion blur values that have been obtained by the blur detecting section 224. If the estimated motion blur value is equal to or smaller than a preset threshold value, no restoration processing is carried out and the process ends. In that case, the long exposure time image will be stored as a result of restoration in the memory 240. On the other hand, if the estimated motion blur value is greater than the preset reference value, the following processing steps S44 through S50 are performed.

Next, in Step S44, the image getting section 222 gets exposure time information. Then, in Step S45, the image synthesizing section 225 synthesizes together the short and long exposure time images, thereby generating a synthetic deteriorated image. Subsequently, in Step S46, the size of the blur kernel is determined by the kernel size determining section 226a. In this processing step, the kernel size determining section 226a chooses an appropriate blur kernel's size associated with the given exposure time ($T_L+T_S$) by reference to the conversion table information. Thereafter, in Step S47, an initial blur kernel is determined by the initial blur kernel setting section 222.

Next, in Step S48, the image restoration section 228 performs image restoration processing using the synthetic deteriorated image that has been generated in Step S45 and the initial blur kernel that has been set in Step S47. This image restoration processing is carried out by a known restoration algorithm. The image restoration section 228 once stores the restored image thus obtained in the memory 240. Thereafter, in Step S49, the kernel estimating section 226c estimates the blur kernel based on the restored image and the parameter updating section 228 updates the previous blur kernel into the blur kernel thus estimated.

Subsequently, in Step S50, a decision is made on whether or not changes of the blur kernel and the restored image before and after the update are smaller than predetermined threshold values. If the changes are equal to or greater than the threshold values, the processing step S48 is carried out again and the same series of the processing steps S48 through S50 will be performed over and over again until the changes become smaller than the threshold values. And when the changes become smaller than the threshold values, it is determined that the processing has converged. In that case, the result of the restoration is stored in the memory 240.

Figure 14:
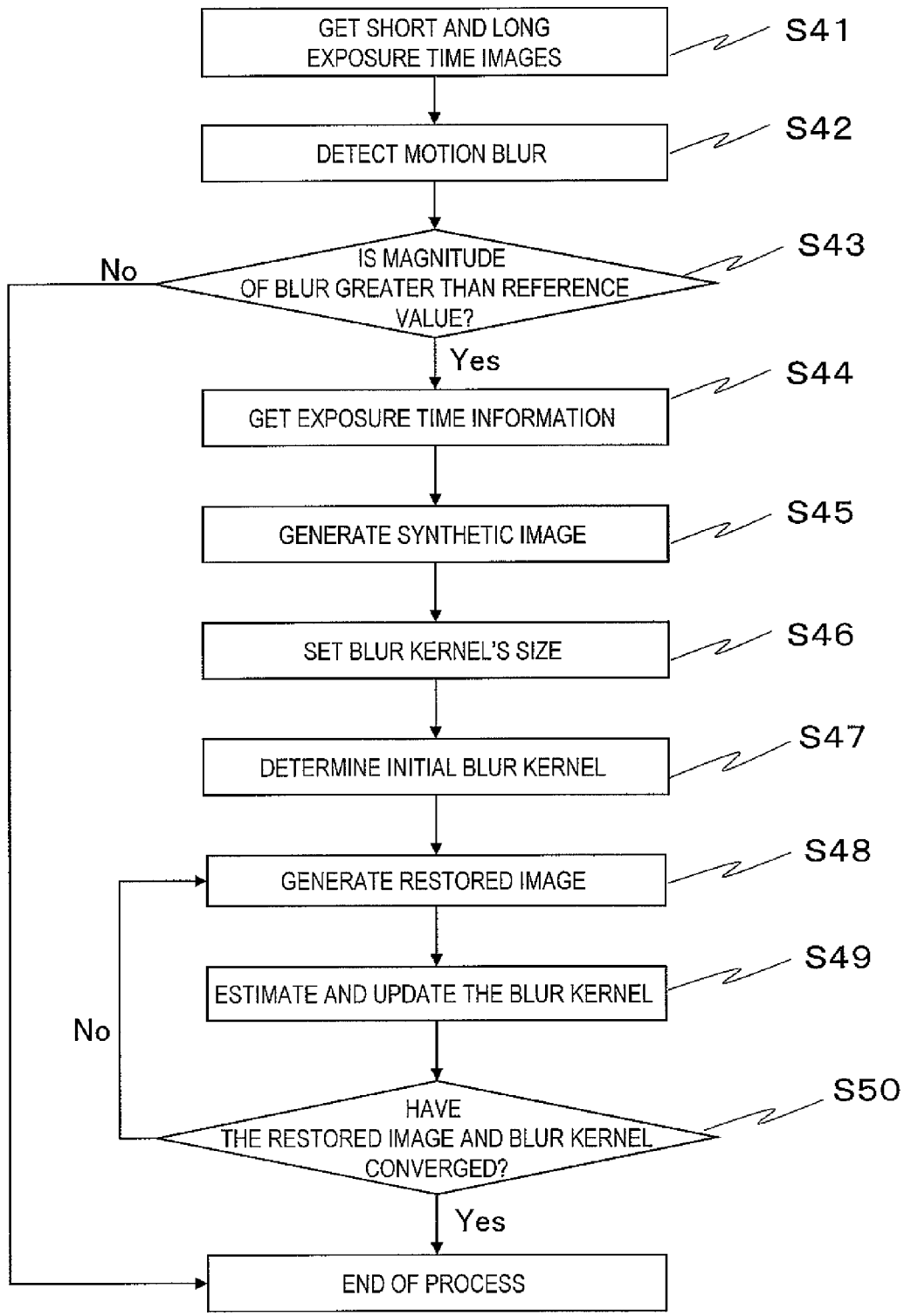
FIG. 14 A flowchart showing a first exemplary procedure of restoration processing that may be carried out in an embodiment of the present invention.

It should be noted that this processing flow is nothing but an example and the respective processing steps do not always have to be done in the order shown in FIG. 14. For example, the processing step S45 of generating a synthetic image may be performed before the processing step S44 of getting exposure time information.

Next, it will be described in further detail how the blur kernel may be estimated and how the image restoration processing may be carried out in Steps S48 and S49.

In this example, it will be described how to perform the image restoration processing by the signal processing method disclosed in Non-Patent Document No. 2. According to the signal processing method of Non-Patent Document No. 2, a first image restoration process is carried out based on the initial blur kernel that has been set in Step S47. At this stage, the blur kernel does not always agree with the true blur kernel (which will be referred to herein as a "right solution"). However, the result of the restoration should be closer to the original image than the deteriorated image is.

Next, the blur kernel is estimated based on a first restored image which has been obtained as a result of the first image restoration process. Since the first restored image is closer to the original image than the deteriorated image is, the blur kernel estimated is also closer to the right solution. Then, the blur kernel thus estimated, i.e., the initial blur kernel, is updated into the next blur kernel and a second image restoration process is carried out. By performing these processing steps over and over again until neither the blur kernel nor the result of the image restoration processing changes any longer, estimation of the blur kernel and the image restoration processing are carried out at the same time.

Hereinafter, it will be described more specifically how to carry out the image restoration processing.

The image restoration section 228 restores an image using a given blur kernel (which is an initial value at first but will be an updated value from next time and on) and the deteriorated image. The following Equation (3) is an evaluation equation $E_L$ for use in this processing:

$$E_L = \left(\sum_{\partial^* \in \Theta} w_{k(\partial^*)} \|\partial^* L \otimes f - \partial^* I\|_2^2\right) + \lambda_1 \|\Phi(\partial_x L) + \Phi(\partial_y L)\|_1 + \lambda_2(\|\partial_x L - \partial_x I\|_2^2 \circ M + \|\partial_y L - \partial_y I\|_2^2 \circ M). \quad (3)$$

where I represents the deteriorated image, L represents a non-blurry image, and f represents the blur kernel. The variables wk, λ1 and λ2 are "weights" to be set manually. θ is a set of operators that defines what kind of differentiation the image is going to be subjected to. Specifically, θ has six differentiation parameters in total for use to perform a zero-order differentiation, first-order differentiations (in the x and y directions, respectively) and second-order differentiations (twice in each of the x and y directions and once more in each of the x and y direction). d* is a differentiation operator. Using d*, θ can be represented as θ={$d^0$, $d_x$, $d_y$, $d_{xx}$, $d_{xy}$, $d_{yy}$}. By adopting d*, processing can be performed using both of the intensity information and the edge information, and therefore, information that could not be obtained only with the intensity can also be gotten. M is a two-dimensional mask and includes a "1" element in pixels included in a flat area of the image (i.e., pixels included in a locally smooth area (Ω)) but a "0" element in pixels in the other areas. $\| \ \|$ and $\| \ \|_p$ indicate p norm operators. And ϕ (x) is a function approximately showing a relation between the intensity gradient x of the image observed in nature and its distribution density (in a logarithmic scale).

The first term on the right side of Equation (3) indicates the difference (i.e., a distance) between an image obtained by performing a convolution on the restored image L and the blur kernel f and the deteriorated image I. By subjecting the image to an operation that uses six differentiation parameters, the degree of approximation of the image can be evaluated based on information about other than the intensity.

The second term on the right side of Equation (3) indicates the property of an intensity gradient in the image (which is called a "heavy tail"). $\Phi(d_x L)$ and $\Phi(d_y L)$ have statistical characteristics that when the intensity gradient of the restored image is represented as a histogram, a peak with a steep probability of occurrence appears at a gradient of around zero and the probability of occurrence falls as the gradient rises. In the second term, distances from the distribution with such statistical characteristics are calculated for each of the gradients in the x and y directions. These statistical characteristics are also used in the method disclosed in Non-Patent Document No. 1.

The third term on the right side of Equation (3) is used to evaluate the degree of flatness using the mask M, the differentiated deteriorated image, and the differentiated restored image. In a flat region, the deteriorated image and the restored image have close intensity gradient values. That is why the error of the gradient values in the x and y directions is used as an evaluation value.

By obtaining L that minimizes the right side of Equation (3), the restored image L can be obtained (i.e., L is optimized). A specific calculation method for optimizing L is disclosed in Non-Patent Document No. 2.

Next, the processing to be performed by the blur kernel estimating section 226c after the restored image L has been obtained will be described in detail.

The blur kernel estimation is a problem for estimating the blur kernel f based on the restored image L that has been obtained by the image restoration section 228 and the deteriorated image I. By determining f so as to minimize the right side of the following Equation (4), the blur kernel f can be obtained (i.e., f is optimized).

$$E(f) = \left(\sum_{\partial^* \in \Theta} w_{k(\partial^*)} \|\partial^* L \otimes f - \partial^* I\|_2^2\right) + \|f\|_1. \quad (4)$$

The first term on the right side of this Equation (4) corresponds to the first term on the right side of Equation (3) and provides an evaluation index indicating whether or not the convolution performed on the restored image L and the blur kernel f is close to the deteriorated image I. The second term on the right side of Equation (4) is a norm of the blur kernel f and is a term based on a so-called "sparse coding" concept. Since most elements of the matrix representing the blur kernel f are zero (i.e., have no motion), this optimization term is used. In this embodiment, the optimization is done by the "interior point method" as in Non-Patent Document No. 2 and overall optimization can get done as a result.

It should be noted that the image restoration processing does not always have to be done as in the example described above. Alternatively, the method disclosed in Non-Patent Document No. 1 or any other blind deconvolution method may also be used.

In the image restoration processing of this embodiment, the point is that the size of the blur kernel is changed as the exposure time varies during shooting. As a result, when an image is shot in a long exposure time, at which motion blur occurs easily, the size of the blur kernel is set to be a large value, and therefore, it is possible to prevent the size of the blur kernel from exceeding the preset one. Conversely, when an image is shot in a short exposure time, the size of the blur kernel is set to be a small value, and therefore, it is possible to avoid doing computations more than necessarily.

Figure 13:
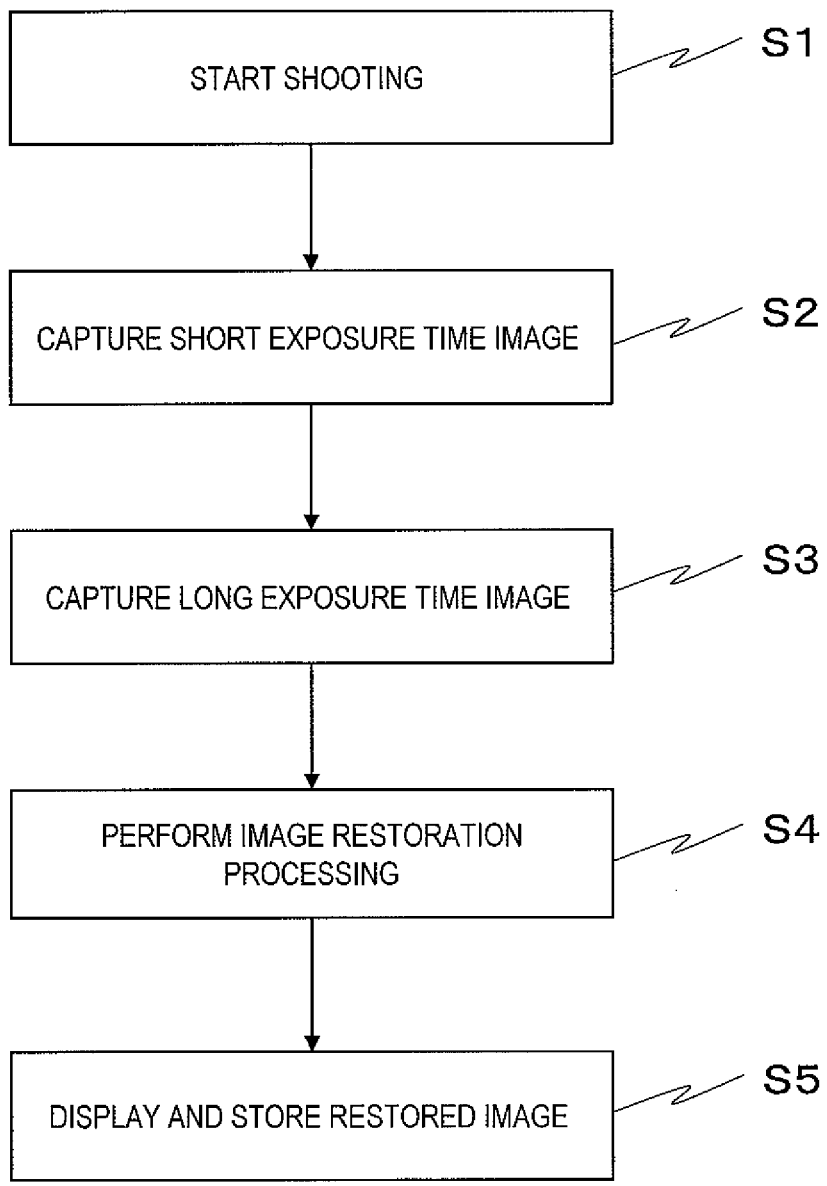
FIG. 13 A flowchart showing the procedure processing that may be carried out in an embodiment of the present invention.

It should be noted that the image restoration processing step S4 shown in FIG. 13 does not always have to be performed in the procedure shown in FIG. 14 but may also be carried out in various other procedures. For example, one of the flows shown in FIGS. 15 to 17 may also be adopted. Hereinafter, those flows will be described one by one.

Figure 15:
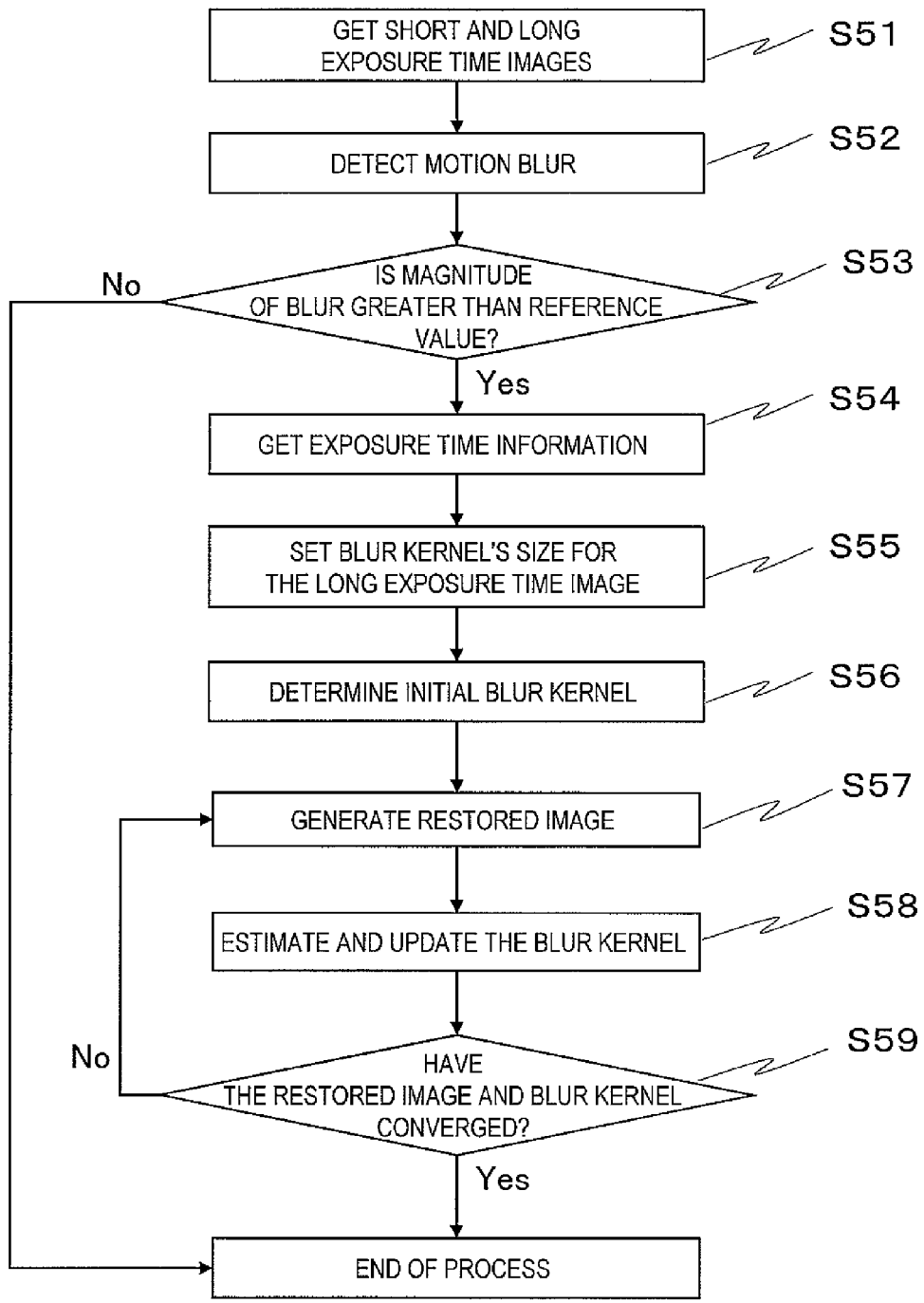
FIG. 15 A flowchart showing a second exemplary procedure of restoration processing that may be carried out in an embodiment of the present invention.

According to the flow shown in FIG. 15, only the long exposure time image is used to estimate a blur kernel and generate a restored image without synthesizing the long and short exposure time images together. First of all, the processing steps S51 through S54 are the same as the processing steps S41 through S44 shown in FIG. 14. Next, in Step S55, the blur kernel's size is determined for the long exposure time image. In this processing step, the kernel size determining section 226a finds a blur kernel's magnification, corresponding to the exposure time $T_L$ when the long exposure time image was gotten, in the conversion table. The processing steps S56 through S59 that follow the processing step S55 are the same as the processing steps S46 through S49 shown in FIG. 14. By performing these processing steps S56 through S59 on the long exposure time image, a restored image is generated. If the flow shown in FIG. 15 is adopted, there is no need to provide the image synthesizing section 225.

Figure 16:
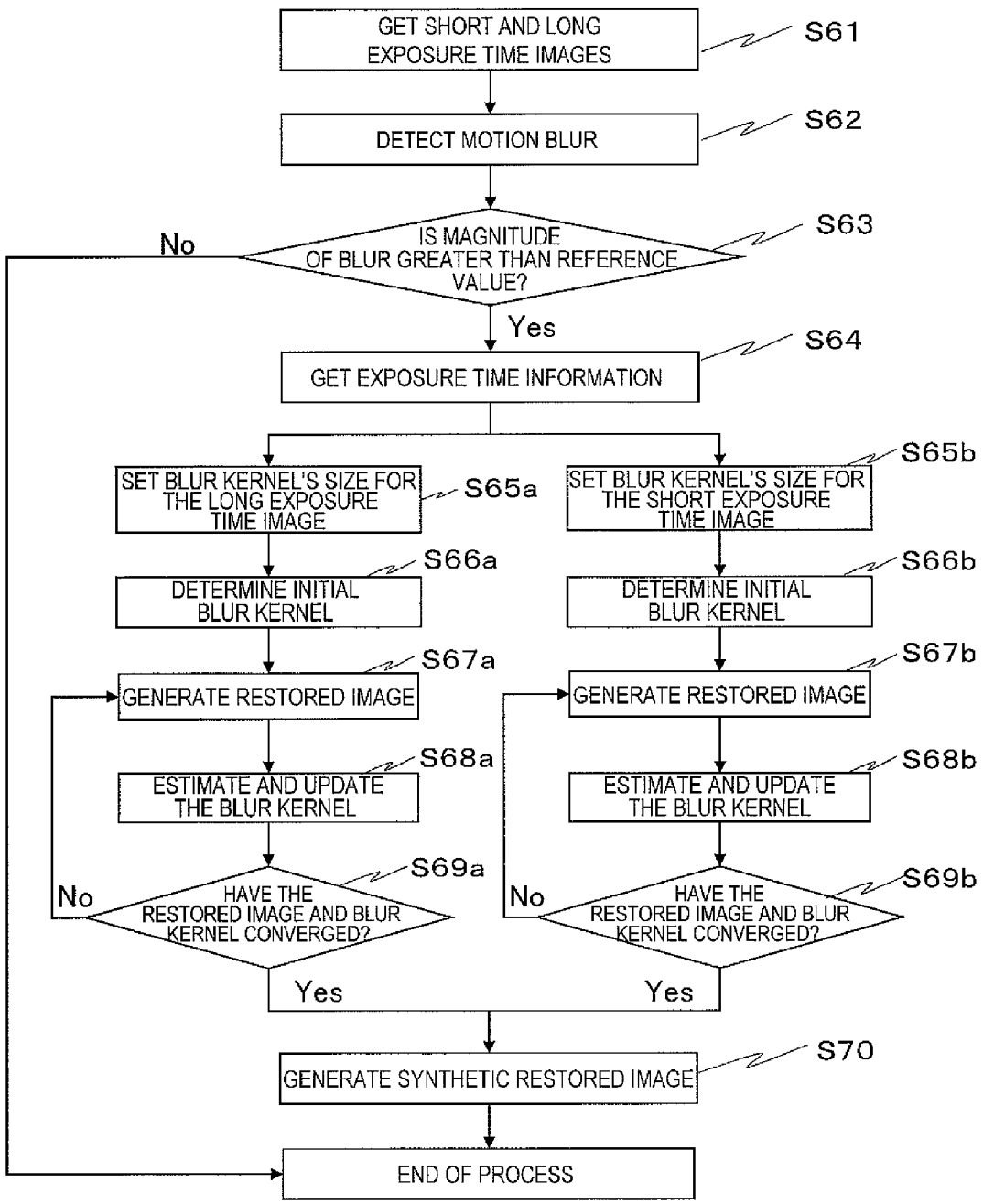
FIG. 16 A flowchart showing a third exemplary procedure of restoration processing that may be carried out in an embodiment of the present invention.

According to the flow shown in FIG. 16, a blur kernel is estimated and a restored image is generated for each of the long and short exposure time images without synthesizing the long and short exposure time images together. The two restored images thus generated are finally synthesized together to generate a synthetic restored image. First of all, the processing steps S61 through S64 are the same as the processing steps S41 through S44 shown in FIG. 14. Next, in Steps S65a through S69a, a blur kernel is estimated and a restored image is generated for the long exposure time image. In the meantime, in Steps S65b through S69b, a blur kernel is estimated and a restored image is generated in the same way for the short exposure time image, too. These two series of processing steps S65a through S69a and S65b through S69b are the same as the processing steps S46 through S50 shown in FIG. 14. In this case, the blur kernel's size for the long exposure time image is determined by reference to the conversion table based on the exposure time $T_L$ when the long exposure time image was gotten. In the same way, the blur kernel's size for the short exposure time image is also determined by reference to the conversion table based on the exposure time $T_S$ when the short exposure time image was gotten. Finally, in Step S70, the image synthesizing section 225 synthesizes together the restored images that have been generated for the long and short exposure time images, thereby generating a synthetic restored image. The synthetic restored image thus generated is stored as a final result of restoration in the memory 240. If the flow shown in FIG. 16 is adopted, the image synthesizing section 225 performs the restored image synthesizing processing step S70 without synthesizing the long and short exposure time images together.

Figure 17:
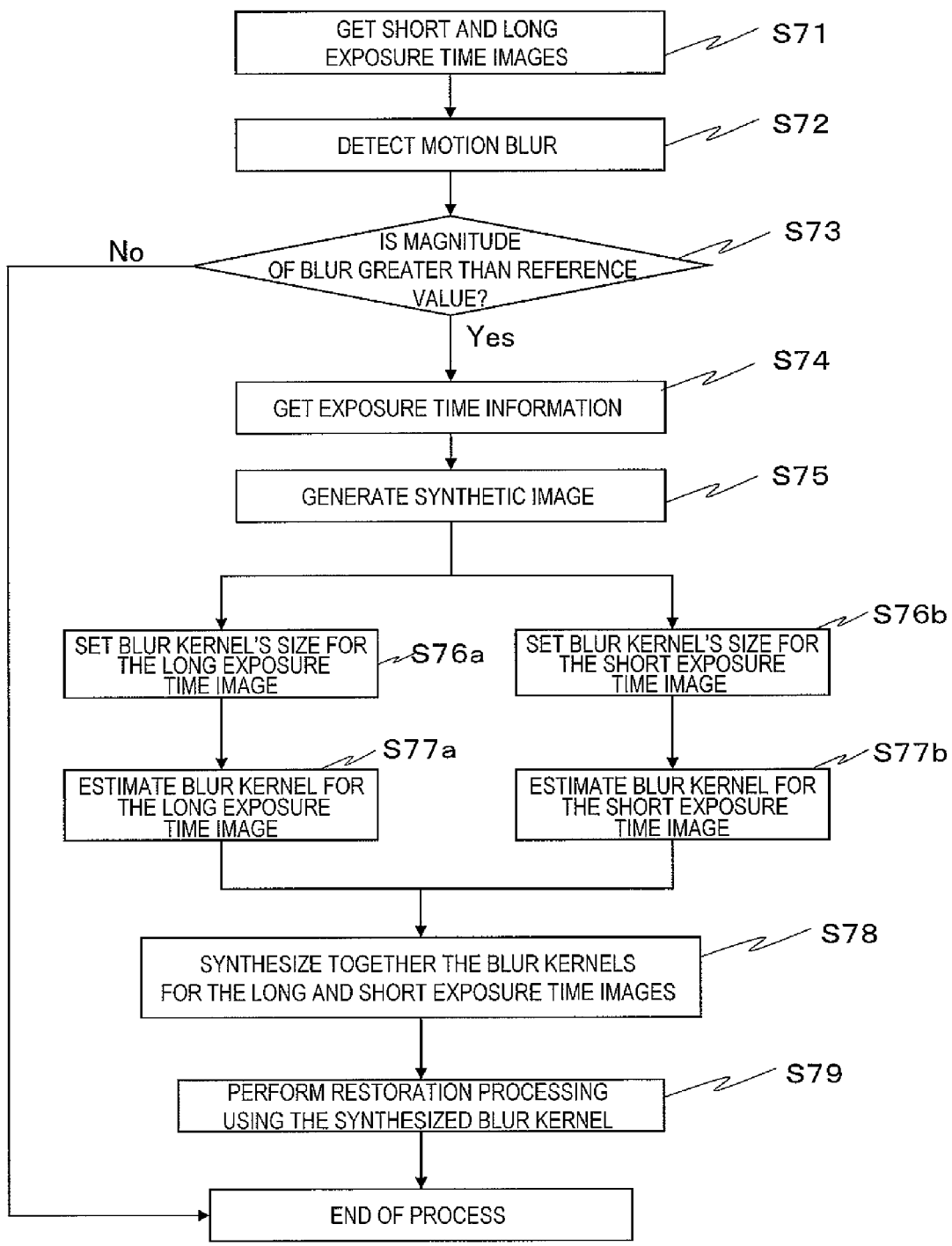
FIG. 17 A flowchart showing a fourth exemplary procedure of restoration processing that may be carried out in an embodiment of the present invention.
Figure 19:
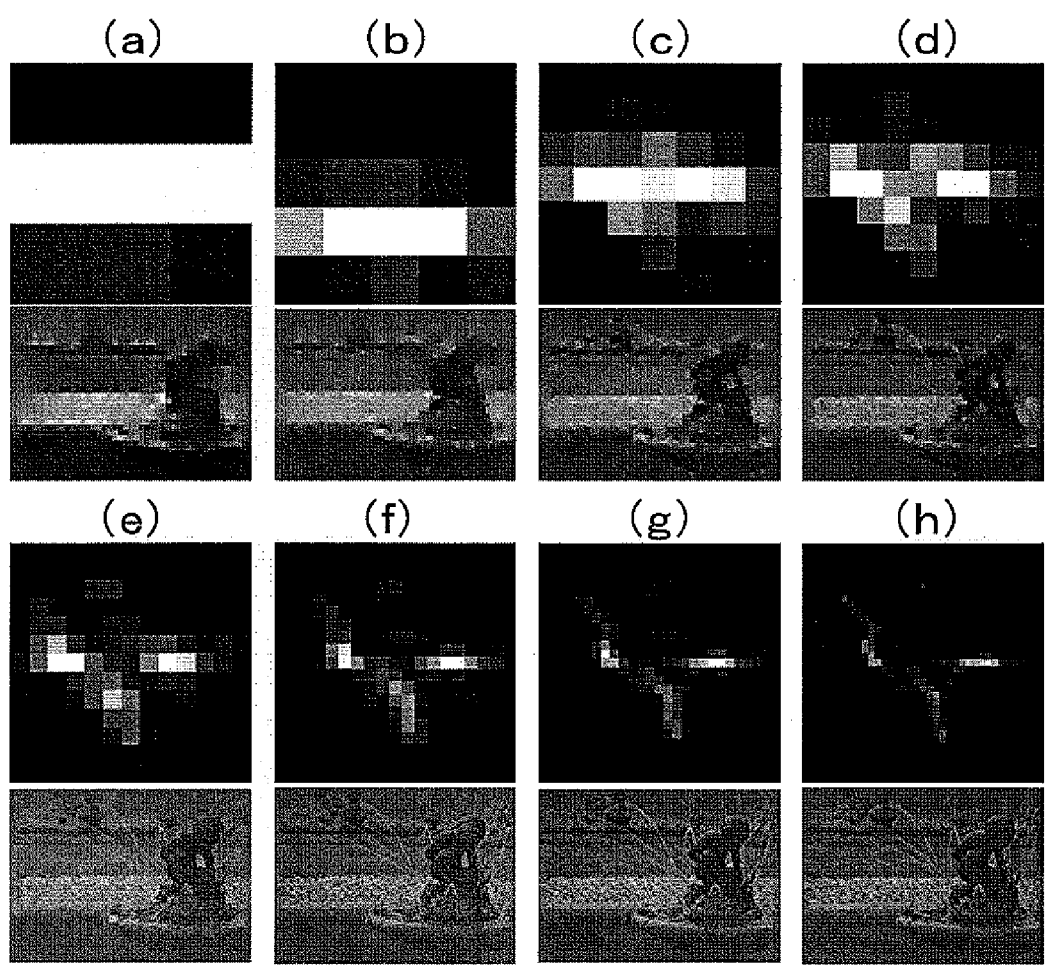
FIG. 19 (a) through (h) illustrate the method disclosed in Non-Patent Document No. 1.

According to the flow shown in FIG. 17, a blur kernel is estimated for each of the long and short exposure time images and a synthetic blur kernel is generated based on those two blur kernels estimated. And by restoring the synthetic image using that synthetic blur kernel, a restored image can be generated. This flow is also applicable to even a situation where the image capture device includes a camera shake sensing mechanism such as a gyrosensor. First of all, the processing steps S71 through S75 are the same as the processing steps S41 through S45 shown in FIG. 14. Next, in Steps S76a through S77a, the blur kernel's size is determined and the blur kernel is estimated for the long exposure time image. In the same way, in Steps S76b through S77b, the blur kernel's size is determined and the blur kernel is estimated for the long exposure time image. In this case, the blur kernel's size for the long exposure time image is determined by reference to the conversion table based on the exposure time $T_L$ when the long exposure time image was gotten. In the same way, the blur kernel's size for the short exposure time image is also determined by reference to the conversion table based on the exposure time $T_S$ when the short exposure time image was gotten. In the processing steps S77a and S77b, the blur kernel may be estimated by a known method in which a blur kernel is estimated based on the magnitude of a camera shake that has been detected by a camera shake sensing mechanism provided for the image capture device, for example. Subsequently, in Step S78, the two blur kernels thus obtained are synthesized together. Finally, in Step S79, the image restoration section 228 restores the synthetic image obtained in Step S75 by using the synthetic blur kernel, thereby generating a restored image. If the flow shown in FIG. 17 is adopted, a restored image may be obtained by performing a known non-blind deconvolution such as a Wiener filter method or a Richardson-Lucy (RL) method in Step S79.

No matter which of the flows shown in FIGS. 15 through 17 is adopted, the blur kernel's size can be changed adaptively according to the exposure time and the effect of this embodiment can be achieved. In each of the flows shown in FIGS. 15 to 17, the respective processing steps may be performed in a different order from the illustrated one as far as it is permitted.

If the image capture device includes a camera shake sensing mechanism such as a gyrosensor, the image capture device may be configured to capture the long exposure time image first and not to get any short exposure time image if the magnitude of the camera shake was smaller than a predetermined threshold value when the long exposure time image was captured. With such a configuration adopted, the short exposure time image is captured and the image restoration processing is carried out only when the image stabilization operation is needed, and therefore, the processing can get done in a shorter time.

Although the image processing section 220 includes the blur detecting section 224 in the embodiment described above, the blur detecting section 224 is not always needed. Without the blur detecting section 224, the processing steps S42 and S43 shown in FIG. 14 or their corresponding processing steps shown in FIGS. 15 to 17 are omitted and the image restoration processing is carried out irrespective of the magnitude of the motion blur of the long exposure time image.

According to this embodiment, as long as the blur kernel's size can be changed appropriately as the exposure time varies, the conversion table does not always have to be used. For example, similar processing can also be carried out by using a function representing the relation between the exposure time and the blur kernel's size. In that case, first of all, a known object of shooting is shot with the exposure time changed one after another, thereby getting blur kernel's sizes at various exposure times. Next, the data thus obtained is plotted in a two-dimensional space with the exposure time represented by the abscissa and the blur kernel's size represented by the ordinate. Subsequently, linear regression and/or curve fitting is performed on the data plotted, thereby representing the relation between the exposure time and the blur kernel's size as a multi-dimensional function. Once such a multi-dimensional function has been obtained in this manner, the exposure time that has been obtained during the shooting session is substituted into the multi-dimensional function, thereby obtaining the blur kernel's size. According to such a method, no conversion table needs to be used.

In the embodiment described above, the blur kernel's size is supposed to be determined only by the exposure time during shooting. However, the blur kernel's size may also be determined by reference to other kinds of information that could affect the magnitude of the motion blur of the image, too. For example, the magnitude of the motion blur of an image is affected by not only the exposure time but also the zoom power for shooting as well. That is to say, if the zoom power (or the focal length) of the optical system is increased to shoot a subject at a distance, the image shot will have a more significant motion blur than a situation where the zoom power is small. That is why if the zoom power is increased to shoot a distant scene, the size of the blur kernel should be set to be a large value. In this description, the "zoom power" refers herein to the ratio of the focal length during shooting to the minimum focal length (i.e., at the wide angle end) of the optical system of the image capture device.

If the blur kernel's size is determined with the zoom power also taken into account, then the image capture device changes the blur kernel's size according to both the exposure time and the zoom power. In that case, both a zoom power related conversion table and an exposure time related conversion table may be stored in the image capture device. For example, if a conversion table similar to the one shown in FIG. 12(a) is also provided for the zoom power, the size of the blur kernel can be determined by multiplying the reference size by magnifications to be obtained from those tables.

Optionally, the zoom power related conversion table and the exposure time related conversion table may be combined together into a single table. FIG. 18 shows examples of such tables in which those two kinds of information are aggregated together. Specifically, FIG. 18(a) shows an exemplary conversion table that defines a correspondence between the zoom power-exposure time combination and the blur kernel's magnification, while FIG. 18(b) shows an exemplary conversion table that defines a correspondence between the zoom power-exposure time combination and the blur kernel's size. No matter which of these two conversion tables shown in FIGS. 18(a) and 18(b) is used, the best blur kernel's size can be chosen with both kinds of information about the zoom power and the exposure time taken into account. For example, if the conversion table shown in FIG. 18(a) is used and if the zoom power falls within the range of z2 through z3, and if the exposure time falls within the range of T2 through T3, the blur kernel's magnification is set to be C22.

The image restoration processing of this embodiment does not have to be carried out by the image processing section built in the image capture device but may also be carried out by an image processor which is independent of the image capture device. For example, even by entering the images and exposure time information that have been gotten by the image capture device into such an image processor and by getting a program defining the processing shown in FIG. 14 or 15 executed by a computer built in that image processor, the restored image can also be obtained.

INDUSTRIAL APPLICABILITY

The image capture device of the present invention has broad industrial applicability because the present invention is applicable to any image capture device that could ever cause a motion blur due to a camera shake. Since a PSF and a restored image can be both estimated even when the PSF is unknown, a much less blurry image can be obtained with or without a special image stabilization mechanism.

The image processor of the present invention does not have to be built in an image capture device but may be configured to receive and process the data of an image that has been captured by the image capture device.

REFERENCE SIGNS LIST 10 image sensor
11 photosensitive cell
15 shutter with diaphragm function
20 shooting lens
30 image sensor driving section
100 image capturing section
200 signal processing section
220 image processing section
222 image getting section
224 blur detecting section
225 image synthesizing section
226 blur kernel determining section
226a kernel size determining section
226b initial kernel setting section
226c kernel estimating section
228 image restoration section
229 parameter updating section
240 memory
260 interface (IF)
280 conversion table
300 display section
400 storage medium
500 system control section

The invention claimed is:

1. An image capture device which generates a restored image by reducing a motion blur that has been induced by a camera shake during shooting, the device comprising:
an image sensor which captures a first image and a second image, which is obtained in a shorter exposure time than the first image, in response to a single shooting instruction from a user; and
an image processor which performs restoration processing on the first and second images that have been captured by the image sensor,
the image processor including:
an image synthesizing section which synthesizes the first and second images to generate a synthetic deteriorated image;
a blur kernel determining section which determines a blur kernel that defines the camera-shake-induced motion blur of the first and second images that have been captured by the image sensor, wherein the blur kernel is a coefficient matrix with a size of N×N, N being an integer N, N≥3, which represents a point spread function; and
an image restoration section which generates a restored image from the synthetic deteriorated image by preforming a deconvolution operation using the blur kernel that has been determined, wherein the restored image has a reduced blur as compared to the first captured image, and
wherein the blur kernel determining section sets the size of the blur kernel depending on the sum of the exposure times in which the first image and the second image are captured, respectively, and the blur kernel determining section increases the size of the blur kernel as the sum of the exposure times becomes longer.

2. The image capture device of claim 1, wherein the image processor performs an iterative processing in which the blur kernel determining section determines a first blur kernel, the image restoration section generates a first restored image based on the synthetic deteriorated image and the first blur kernel, the blur kernel determining section determines a $(k+1)^{th}$ blur kernel, wherein k is a natural number, based on the synthetic deteriorated image and a $k^{th}$ restored image generated by the image restoration section, and the image restoration section generates a $(k+1)^{th}$ restored image based on the synthetic deteriorated image and the $(k+1)^{th}$ blur kernel.

3. The image capture device of claim 1, further comprising a blur detecting section which calculates a value indicating the magnitude of blur of the first image by comparing the first and second images that have been captured by the image sensor,
wherein if the value that has been determined by the blur detecting section is greater than a predetermined reference value, the image processing section performs the restoration processing, but
if the value is less than the reference value, the image processing section does not perform the restoration processing.

4. The image capture device of claim 1, wherein the blur kernel determining section additionally changes the size of the blur kernel depending on a zoom power to capture the first image with.

5. An image processor which preforms restoration processing using a first image and a second image that have been captured by an image capture device in response to a single shooting instruction from a user, the second image being captured in a shorter exposure time than the first image, the processor comprising:
an image getting section which gets, from the image capture device, the first and second images and information about the exposure times in which the first image and the second image are captured, respectively;
an image synthesizing section which synthesizes the first and second images to generate a synthetic deteriorated image;
a blur kernel determining section which determines a blur kernel that defines the camera-shake-induced motion blur of the first and second images that have been captured by the image capture device, wherein the blur kernel is a coefficient matrix with a size of N×N, N being an integer N, N≥3, which represents a point spread function; and
an image restoration section which generates a restored image from the synthetic deteriorated image by preforming a deconvolution operation using the blur kernel that has been determined, wherein the restored image has a reduced blur as compared to the first image, and
wherein the blur kernel determining section sets the size of the blur kernel depending on the sum of the exposure times in which the first image and the second image are captured, respectively, and the blur kernel determining section increases the size of the blur kernel as the sum of the exposure times becomes longer.

6. A computer program, stored on a non-transitory computer-readable storage medium, to be executed by a computer for performing restoration processing using a first image and a second image that have been captured by an image capture device in response to a single shooting instruction from a user, the second image being captured in a shorter exposure time than the first image, the program being defined so as to make the computer perform:
getting the first and second images and information about the exposure times in which the first and second images are captured, respectively;
synthesizing the first and second images to generate a synthetic deteriorated image;
determining a blur kernel, which defines the camera-shake-induced motion blur of the first image and the second image that are captured, respectively, wherein the blur kernel is a coefficient matrix with a size of N×N, N being an integer N, N≥3, which represents a point spread function, and wherein a size of the blur kernel is set depending on the sum of the exposure times in which the first image and the second image are captured, respectively, and the set size of the blur kernel increases as the sum of the exposure times becomes longer;
generating a restored image from the synthetic deteriorated image by preforming a deconvolution operation using the blur kernel determined, wherein the restored image has a restored blur as compared to the first captured image.

7. An image processing method for performing restoration processing using a first image and a second image that have been captured by an image capture device in response to a single shooting instruction from a user, the second image being captured in a shorter exposure time than the first image, the method comprising:
getting the first and second images and information about the exposure times in which the first and second images are captured, respectively;
synthesizing the first and second images to generate a synthetic deteriorated image;
determining a blur kernel, which defines the camera-shake-induced motion blur of the first image and the second image that are captured, respectively, wherein the blur kernel is a coefficient matrix with a size of N×N, N being an integer N, N≥3, which represents a point spread function, and wherein a size of the blur kernel is set depending on the sum of the exposure times in which the first image and the second image are captured, respectively, and the set size of the blur kernel increases as the sum of the exposure times becomes longer;
generating a restored image from the synthetic deteriorated image by preforming a deconvolution operation using the blur kernel determined, wherein the restored image has a restored blur as compared to the first captured image.

* * * * *